United States Patent
Suzuki et al.

(10) Patent No.: US 9,263,750 B2
(45) Date of Patent: Feb. 16, 2016

(54) METHOD FOR MANUFACTURING FUEL CELL SEPARATOR

(75) Inventors: Shunya Suzuki, Tokyo (JP); Tadashi Iino, Tokyo (JP); Zenichiro Izumi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 218 days.

(21) Appl. No.: 14/116,439

(22) PCT Filed: May 30, 2012

(86) PCT No.: PCT/JP2012/063967
§ 371 (c)(1),
(2), (4) Date: Nov. 8, 2013

(87) PCT Pub. No.: WO2012/165492
PCT Pub. Date: Dec. 6, 2012

(65) Prior Publication Data
US 2014/0087287 A1    Mar. 27, 2014

(30) Foreign Application Priority Data
May 30, 2011   (JP) .................................. 2011-120635

(51) Int. Cl.
*H01M 8/04* (2006.01)
*H01M 8/02* (2006.01)
*H01M 8/10* (2006.01)

(52) U.S. Cl.
CPC .......... *H01M 8/0247* (2013.01); *H01M 8/0213* (2013.01); *H01M 8/0221* (2013.01);
(Continued)

(58) Field of Classification Search
CPC ................... H01M 2008/1095; H01M 8/0213; H01M 8/0221; H01M 8/0228; H01M 8/0247; H01M 8/0254; Y02E 60/50
See application file for complete search history.

(56) References Cited

U.S. PATENT DOCUMENTS

2004/0121122 A1   6/2004   Reynolds, III et al.
2006/0210860 A1   9/2006   Inagaki et al.
(Continued)

FOREIGN PATENT DOCUMENTS

CN   1898827 A      1/2007
EP   1 020 941 A2   7/2000
(Continued)

OTHER PUBLICATIONS

International Search Report for PCT/JP2012/063967 dated Sep. 4, 2012.
(Continued)

*Primary Examiner* — Patrick Ryan
*Assistant Examiner* — Ben Lewis
(74) *Attorney, Agent, or Firm* — Sughrue Mion, PLLC

(57) ABSTRACT

A method for manufacturing a fuel cell which includes layering and compression molding at least one of each of: thermoplastic resin sheets (A) containing 130 to 3,200 parts by weight of a carbonaceous material per 100 parts by weight of a thermoplastic resin; and thermoplastic resin sheets (B) containing 3 to 280 parts by weight of a carbonaceous material per 100 parts by weight of a thermoplastic resin, 50% to 100% by weight of the carbonaceous material being fibrous carbon. The thermoplastic resin sheets (A and B) are compression molded at a temperature 60° C. higher than the higher of the melting points of the two types of sheets such that the ratio between the final thickness ($d_A$) of the compressed first thermoplastic resin sheet(s) (A) and the final thickness ($d_B$) of the compressed second thermoplastic resin sheet(s) (B) satisfies the relation $d_A/d_B \geq 2$.

24 Claims, 9 Drawing Sheets

(52) U.S. Cl.
CPC .......... *H01M8/0228* (2013.01); *H01M 8/0254* (2013.01); *H01M 2008/1095* (2013.01); *Y02E 60/50* (2013.01); *Y02P 70/56* (2015.11)

(56) References Cited

U.S. PATENT DOCUMENTS

2007/0128464 A1   6/2007   Jang
2007/0178349 A1   8/2007   Iino et al.
2008/0268318 A1   10/2008  Jang et al.

FOREIGN PATENT DOCUMENTS

| EP | 1 744 389 | A1 | 1/2007 | |
|----|-----------|----|--------|---|
| JP | 2000-208154 | A | 7/2000 | |
| JP | 2004-111304 | * | 4/2004 | .............. H01M 8/02 |
| JP | 2004-111304 | A | 4/2004 | |
| JP | 2006-260956 | A | 9/2006 | |
| JP | 2007-26828 | A | 2/2007 | |
| JP | 2007-277475 | A | 10/2007 | |
| JP | 2009-93967 | A | 4/2009 | |
| WO | 2005062407 | A2 | 7/2005 | |

OTHER PUBLICATIONS

Communication dated Feb. 19, 2015 from the European Patent Office in counterpart European Application No. 12793649.0.

* cited by examiner

METHOD FOR MANUFACTURING FUEL CELL SEPARATOR

CROSS REFERENCE TO RELATED APPLICATIONS

This application is a National Stage of International Application No. PCT/JP2012/063967 filed May 30, 2012, claiming priority based on Japanese Patent Application No. 2011-120635 filed May 30, 2011, the contents of all of which are incorporated herein by reference in their entirety.

TECHNICAL FIELD

The present invention relates to a method for manufacturing a fuel cell separator composed of a thermoplastic resin composition, a fuel cell separator manufactured with that method, and a fuel cell that uses that fuel cell separator.

BACKGROUND ART

Fuel cells have attracted attention in recent years in consideration of environmental issues and energy issues. Fuel cells generate electrical power by a reverse reaction of the electrolysis of water that uses hydrogen and oxygen, and provide a clean electrical power generation device for which the only waste product is water. Although fuel cells are classified into several types corresponding to the type of electrolyte used, since polymer electrolyte fuel cells in particular operate at a low temperature, they are the most promising for use in automobiles and consumer applications. Such fuel cells are able to achieve high output power generation by laminating single cells composed of, for example, a solid polymer electrolyte, gas diffusion electrode, catalyst and separator.

In a fuel cell having the aforementioned configuration, flow paths (grooves) for supplying fuel gas (such as hydrogen) and oxidant gas (such as oxygen) and discharging generated moisture (water vapor) are normally formed in separators for partitioning single cells. For this reason, separators are required to have high gas impermeability that enables complete separation of these gases as well as high electrical conductivity for reducing internal resistance of the flow path portion. Moreover, they are also required to have superior thermal conductivity, durability, strength and the like.

Since the fuel cells used in automobiles in particular are required to have large capacity, in addition to the aforementioned characteristics, these fuel cells are also required to be free of the occurrence of cracking and breakage caused by vibrations during vehicle operation despite being thin and having a large surface area.

Fuel cell separators are broadly classified into metal separators, carbon sheet separators and separators formed by mixing a resin into a carbonaceous material. Among these, separators obtained by mixing a resin into a carbonaceous material offer the advantage of allowing separators that are more resistant to corrosion than metal separators and more resistant to bending and vibrations than carbon sheets to be obtained at low cost.

Although it is necessary to fill fuel cell separators obtained by mixing a resin into a carbonaceous material with a large amount of carbon material in order to ensure adequate electrical conductivity, when these separators are filled with a large amount of carbon material, the separator becomes brittle which tends to result in increased susceptibility to cracking and breakage.

Although efforts to improve mechanical characteristics by reinforcing resin moldings with carbon fiber have been made in the past in order to prevent cracking and breakage of resin moldings, since moldability becomes inferior and dimensional precision of the molding tends to become poor as the amount of carbon fiber incorporated in the resin molding increases, carbon fiber is normally only added in small amounts, and it difficult to obtain a separator that is favorable with respect to all requirements relating to mechanical characteristics, electrical conductivity and dimensional precision simply using carbon fiber for the carbon material used in separators. Consequently, various contrivances have been made to obtain a separator that is favorable in all aspects of mechanical characteristics, electrical conductivity and dimensional precision.

For example, Patent Document 1 and Patent Document 2 disclose a fuel cell separator obtained by molding a resin composition containing graphite and carbon fiber.

In addition, Patent Document 3 discloses a fuel cell separator obtained by molding electrically conductive fiber sheets, having carbon fibers arranged in the same direction, interposed about an electrically conductive resin sheet containing another electrically conductive substance such as graphite.

PRIOR ART DOCUMENTS

Patent Documents

Patent Document 1: Japanese Unexamined Patent Publication No. 2007-277475
Patent Document 2: Japanese Unexamined Patent Publication No. 2006-260956
Patent Document 3: Japanese Unexamined Patent Publication No. 2009-93967

SUMMARY OF THE INVENTION

Problems to be Solved by the Invention

The mechanical characteristics, electrical conductivity and dimensional precision of fuel cell separators are required to be further improved.

Although a method for satisfying all of these requirements has been proposed that consists of fabricating flow paths required for electrical conductivity with a material containing a carbon material such as graphite having superior electrical conductivity, and fabricating an outer periphery, which is not required to have electrical conductivity but is susceptible to the application of external force, with a material that contains carbon fiber, followed by joining the two components, this method has the shortcoming of having a complex manufacturing process.

Therefore, an object of the present invention is to provide a fuel cell separator having favorable mechanical characteristics, such as bending strength or bending strain, electrical conductivity and dimensional precision, which can be manufactured by a simple method.

Means for Solving the Problem

Namely, the present invention relates to that described in [1] to [13] below.

[1] A method for manufacturing a fuel cell separator comprising a flow path portion in which gas flow paths are formed on one side or both sides thereof and an outer peripheral portion formed so as to surround the flow path portion, wherein the method comprises a step of compression molding a thermoplastic resin sheet A, comprising 100 parts by weight of a thermoplastic resin and 130 to 3200 parts by weight of a carbonaceous material and a thermoplastic resin sheet B comprising 100 parts by weight of thermoplastic resin and 3 to 280 parts by weight of a carbonaceous material, 50% to 100% by weight of which is fibrous carbon, in a state in which the sheets are laminated at least one sheet at a time; and when the thermoplastic resin sheet A and the thermoplastic resin sheet B are compressed from a sheet thickness of 1 mm under molding conditions consisting of a temperature 60° C. higher than the higher of the melting points of their respective binder components, surface pressure of 20 MPa and pressurization time of 60 seconds, the ratio of the final thickness $d_A$ of the thermoplastic resin sheet A to the final thickness $d_B$ of the thermoplastic resin sheet B satisfies the relational expression $d_A/d_B \geq 2$.

[2] The method for manufacturing a fuel cell separator according to [1], wherein, when installing the thermoplastic resin sheet A in a mold for compression molding, the shape of the thermoplastic resin sheet A is that which is able to cover a portion corresponding to the flow path portion of the fuel cell separator, and when the thickness of the thermoplastic resin sheet A before compression molding is defined as $t_A$, the projected area of the flow path portion is defined as $S_F$ and the volume of the flow path portion is defined as $V_F$, the following relational expression is satisfied.

$$t_A \geq 0.7 V_F/S_F$$

[3] The method for manufacturing a fuel cell separator according to [1] or [2], wherein, when installing the thermoplastic resin sheet B in a mold for compression molding, the shape of the primary surface of the thermoplastic resin sheet B is that which is able to cover one primary surface of the thermoplastic resin sheet A, and the volume $V_B$ thereof satisfies the following relational expression:

$$V_B \geq V - V_A$$

wherein V represents the total volume of the resulting fuel cell separator and $V_A$ represents the volume of the thermoplastic resin sheet A when the thermoplastic resin sheet A is installed in the mold.

[4] The method for manufacturing a fuel cell separator according to any of [1] to [3], wherein, when the melting point of a binder component of the thermoplastic resin sheet A is defined as $Tm_A$ and the melting point of a binder component of the thermoplastic resin sheet B is defined as $Tm_B$, then the following relational expression is satisfied.

$$0° C. \leq (Tm_A - Tm_B) \leq 80° C.$$

[5] The method for manufacturing a fuel cell separator according to any of [1] to [4], wherein the volume resistivity value of the thermoplastic resin sheet A at 23° C. is 50 mΩ·cm or less.

[6] The method for manufacturing a fuel cell separator according to any of [1] to [5], wherein the carbonaceous material contained in the thermoplastic resin sheet A is at least one selected from the group consisting of natural graphite, synthetic graphite and expanded graphite.

[7] The method for manufacturing a fuel cell separator according to any of [1] to [6], wherein the fibrous carbon is at least one selected from the group consisting of carbon fibers, carbon nanofibers, carbon nanotubes and vapor grown carbon fibers.

[8] A fuel cell separator manufactured by the method according to any of [1] to [7].

[9] A fuel cell separator comprising a flow path portion in which gas flow paths are formed on one side or both sides thereof and an outer peripheral portion formed so as to surround the flow path portion, wherein the separator has a region A comprising 100 parts by weight of a thermoplastic resin and 130 to 3200 parts by weight of a carbonaceous material and a region B comprising 100 parts by weight of a thermoplastic resin and 3 to 280 parts by weight of a carbonaceous material, 50% to 100% by weight of which is fibrous carbon; and the region A accounts for 70% or more of the volume of the flow path portion and the ends of the separator consist of the region B.

[10] The fuel cell separator according to [8] or [9], wherein density $D_F$ of the flow path portion and density $D_O$ of the outer peripheral portion satisfy the relational expression $D_F \geq D_O$.

[11] The fuel cell separator according to any of [8] to [10], wherein the flow path portion has hollow flow paths.

[12] A fuel cell comprising the fuel cell separator according to any of [8] to [11].

[13] The fuel cell according to [12] that is a polymer electrolyte fuel cell.

Advantageous Effects of the Invention

According to the method of the present invention, a fuel cell separator having superior mechanical characteristics, electrical conductivity and dimensional precision can be obtained by a simple method comprising laminating a plurality of sheets and compression molding them.

MODE FOR CARRYING OUT THE INVENTION

The following provides a more detailed explanation of the present invention.

The present invention is a method for manufacturing a fuel cell separator comprising a flow path portion in which gas flow paths are formed on one side or both sides thereof and an outer peripheral portion formed so as to surround the flow path portion, wherein the method comprises a step of compression molding a thermoplastic resin sheet A, comprising 100 parts by weight of a thermoplastic resin and 130 to 3200 parts by weight of a carbonaceous material and a thermoplastic resin sheet B comprising 100 parts by weight of thermoplastic resin and 3 to 280 parts by weight of a carbonaceous material, 50% to 100% by weight of which is fibrous carbon, in a state in which the sheets are laminated at least one sheet at a time.

When the thermoplastic resin sheet A and the thermoplastic resin sheet B are compressed from a sheet thickness of 1 mm under molding conditions consisting of a temperature 60° C. higher than the higher of the melting points of their respective binder components, surface pressure of 20 MPa and pressurization time of 60 seconds, the ratio of the final thickness $d_A$ of the thermoplastic resin sheet A to the final thickness $d_B$ of the thermoplastic resin sheet B satisfies the relational expression $d_A/d_B \geq 2$. Here, the binder component refers to the thermoplastic resins contained in each sheet as well as elastomers to be subsequently described and components dissolved therein.

Figure 1:
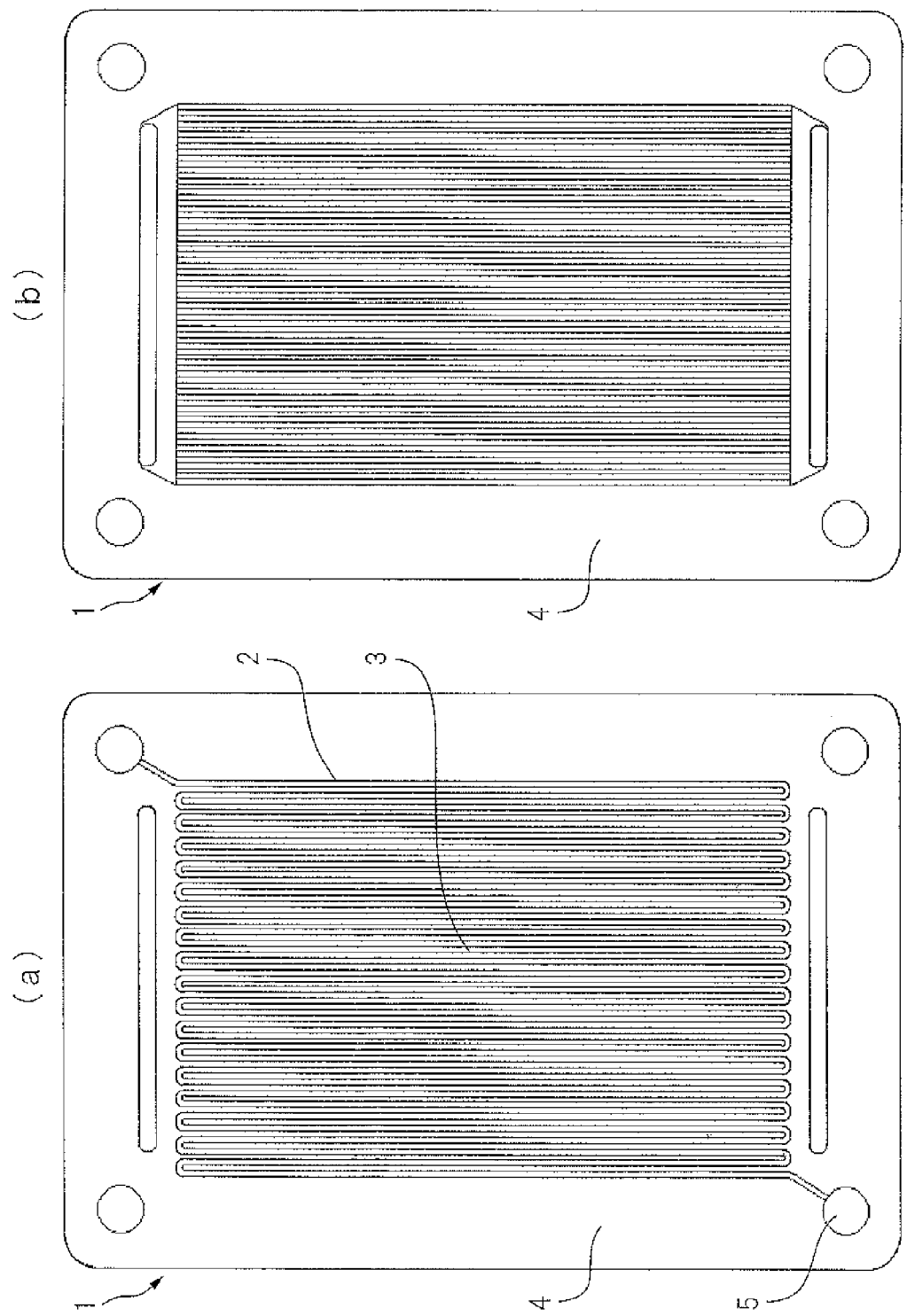
FIG. 1 is a schematic diagram showing one example of a fuel cell separator.

The fuel cell separator is composed of a flow path portion, in which gas flow paths are formed on one side or both sides thereof, and an outer peripheral portion formed so as to surround the flow path portion. FIG. 1 shows one example of a fuel cell separator. FIG. 1(a) shows a top view, while FIG. 1(b) shows a bottom view. In FIG. 1, reference symbol 1 indicates a fuel cell separator, reference symbol 2 indicates gas flow paths, reference symbol 3 indicates a flow path portion, and reference symbol 4 indicates an outer peripheral portion. There are no particular limitations on the flow path arrangement or cross-sectional shape, and an arrangement and cross-sectional shape known to be used in fuel cell separators can be used in addition to that shown in FIG. 1. Examples of the cross-sectional shape of the flow path portion include the corrugated shape shown in FIG. 2, the front-back symmetrical shape shown in FIG. 3, and the shape having hollow flow paths 6 shown in FIG. 4.

In addition, the outer peripheral portion may be provided with an internal manifold 5 for introducing gas or cooling water into the flow paths or for discharging unnecessary gas or generated water.

(Method for Manufacturing Fuel Cell Separator)

The fuel cell separator is manufactured by compression molding a thermoplastic resin sheet A, comprising a thermoplastic resin and a carbonaceous material, and a thermoplastic resin sheet B, comprising a thermoplastic resin and a carbonaceous material comprising fibrous carbon, in a state in which the sheets are laminated at least one sheet at a time. In the case of laminating two or more of at least one of the thermoplastic resin sheet A and the thermoplastic resin sheet B, the thermoplastic resin sheet A and the thermoplastic resin sheet B are preferably alternately laminated and the outermost layer is the thermoplastic resin sheet B.

In the following explanation, the "thermoplastic resin sheet A" may be simply referred to as "sheet A", while the "thermoplastic resin sheet B" may be simply referred to as "sheet B".

(Composition of Sheet A)

The thermoplastic resin sheet A comprises a thermoplastic resin and a carbonaceous material, and comprises 100 parts by weight of the thermoplastic resin and 130 parts by weight to 3200 parts by weight, preferably 300 parts by weight to 2500 parts by weight, and more preferably 500 parts by weight to 900 parts by weight of the carbonaceous material. When the thermoplastic resin sheet A is composed in this manner, a fuel cell separator can be obtained that has favorable electrical conductivity of the flow path portion.

(Composition of Sheet B)

The thermoplastic resin sheet B comprises a thermoplastic resin and a carbonaceous material, and comprises 100 parts by weight of the thermoplastic resin and 3 parts by weight to 280 parts by weight, preferably 10 parts by weight to 120 parts by weight, and more preferably 60 parts by weight to 80 parts by weight of the carbonaceous material. 50% by weight to 100% by weight, preferably 80% by weight to 100% by weight, and more preferably 90% by weight to 100% by weight of the carbonaceous material contained in the thermoplastic resin sheet B is fibrous carbon. When the thermoplastic resin sheet B is composed in this manner, a fuel cell separator can be obtained which has superior mechanical characteristics.

(Final Compressed Thickness of Thermoplastic Resin Sheets)

The ratio of the final thicknesses $d_A$ and $d_B$ during isostatic compression loading of the thermoplastic resin sheet A and the thermoplastic resin sheet B is preferably such that $d_A/d_B \geq 2$, more preferably such that $d_A/d_B \geq 5$, and even more preferably such that $d_A/d_B \geq 7$. As a result, when the thermoplastic resin layer A and the thermoplastic resin layer B are superimposed and subjected to compression molding, the resulting laminate is extruded to the outside with only the thermoplastic resin sheet B deforming without hardly any deformation of the thermoplastic resin sheet A. As a result, a region A derived from the thermoplastic resin sheet A having a low volume resistivity value is mainly formed in the flow path portion requiring electrical conductivity, and since a region B derived from the thermoplastic resin sheet B having favorable bending characteristics is mainly formed in the outer peripheral portion that is susceptible to the application of impacts from the outside, a fuel cell separator can be easily obtained in which both mechanical characteristics and electrical conductivity of the flow path portion are realized. In addition, since the thermoplastic resin sheet B is present that flows easily during molding, material is filled into all areas of the mold, thereby allowing the obtaining of a fuel cell separator having favorable dimensional precision. In addition, the aforementioned ratio is preferably such that $d_A/d_B \leq 50$ and more preferably such that $d_A/d_B \leq 10$.

From the viewpoint of enhancing the electrical conductivity of the flow path portion of the resulting fuel cell separator, the final compressed thickness of the sheet A under the measurement conditions to be subsequently described is preferably 0.1 mm or more and more preferably 0.2 mm or more. In addition, from the viewpoint of dimensional precision of the flow path portion, the final compressed thickness of the sheet A under the measurement conditions to be subsequently described is preferably 0.7 mm or less and more preferably 0.3 mm or less.

From the viewpoint of allowing the sheet B to easily spread to the outer peripheral portion of the resulting fuel cell separator, the final compressed thickness of the sheet B under the measurement conditions to be subsequently described is preferably 0.08 mm or less and more preferably 0.05 mm or less. From the viewpoint of the mechanical characteristics of the resulting fuel cell separator, the final compressed thickness of the sheet B is preferably 0.005 mm or more and more preferably 0.01 mm or more.

The requirement of $d_A/d_B \geq 2$ can be satisfied by suitably selecting the types and contents of the thermoplastic resins and carbonaceous materials that compose the thermoplastic resin sheet A and the thermoplastic resin sheet B. For example, this requirement can be satisfied in the manner described below.

Content of carbonaceous material: The value of $d_A/d_B$ can be increased by making the content of carbonaceous material in the thermoplastic resin sheet A to be greater than the content of carbonaceous material in the thermoplastic resin sheet B, and more specifically, the contents of the carbonaceous material in the sheet A and sheet B are preferably as previously described.

Type of carbonaceous material: In the case of combining the use of a carbonaceous material other than fibrous carbon in the thermoplastic resin sheet B, the fluidity of sheet B improves and the value of $d_A/d_B$ can be increased if the content of Ketjen black in the carbonaceous material of sheet B is preferably 0% by weight to 10% by weight and more preferably 0% by weight to 5% by weight.

Melting point or softening point of thermoplastic resins: The value of $d_A/d_B$ can be increased by using a thermoplastic resin having a high melting point or softening point for the thermoplastic resin sheet A and using a thermoplastic resin having a low melting point or softening point for the thermoplastic resin sheet B. The melting points of the thermoplastic resins can be measured in compliance with JIS K7121 while the softening points can be measured in compliance with JIS K2531.

Molecular weight of thermoplastic resins: The value of $d_A/d_B$ can be increased by using a thermoplastic resin containing a large amount of a high molecular weight component in the thermoplastic resin sheet A and using a thermoplastic resin containing a large amount of a low molecular weight component in the thermoplastic resin sheet B.

Melt flow rate of thermoplastic resins: The value of $d_A/d_B$ can be increased by lowering the melt flow rate of the thermoplastic resin used in sheet A and increasing the melt flow rate of the thermoplastic resin used in sheet B. More specifically, the melt flow rate of the thermoplastic resin of sheet A as measured in compliance with ISO 1873-2.2:95 is preferably 0.1 g/10 min to 50 g/10 min and more preferably 0.2 g/10 min to 40 g/10 min. In addition, the melt flow rate of sheet B as measured in the same manner is preferably 1 g/10 min to 70 g/10 min and more preferably 20 g/10 min to 50 g/10 min.

Furthermore, not all of these conditions are required to be satisfied simultaneously, but rather may be suitably selected and combined so as to satisfy $d_A/d_B \geq 2$.

In the case of laminating a plurality of the thermoplastic resin sheets A having different values for $d_A$, the value obtained by weight averaging the value of $d_A$ of each thermoplastic resin sheet A with the thickness of each thermoplastic resin sheet A is used for the value of $d_A$. Similarly, in the case of laminating a plurality of the thermoplastic resin sheets B having different values for $d_B$, the value obtained by weight averaging the value of $d_B$ of each thermoplastic resin sheet B with the thickness of each thermoplastic resin sheet B is used for the value of $d_B$. For example, in the case of laminating one each of a thermoplastic resin sheet A1 having a final compressed thickness $d_{A1}$ and thickness $t_{A1}$ and a thermoplastic sheet A2 having a final compressed thickness $d_{A2}$ and thickness $t_{A2}$, then $d_A = (t_{A1}d_{A1} + t_{A2}d_{A2})(t_{A1} + t_{A2})$.

(Measurement of Final Compressed Thickness of Thermoplastic Resin Sheets)

Final compressed thickness is measured by respectively preparing the thermoplastic resin sheet A and the thermoplastic resin sheet B to a diameter of 50 mm and thickness of 1 mm, placing the test piece between two cemented carbide plates having a diameter of 50 mm and thickness of 5 mm, compressing under prescribed conditions using a hot press, measuring the thickness of the test piece after compressing with a caliper or micrometer and the like, and determining the ratio. Molding conditions consist of adequately preheating to a set temperature 60° C. higher than the higher of the melting points of the binder components contained in the thermoplastic resin sheet A and the thermoplastic resin sheet B and compressing at a surface pressure of 20 MPa and pressurization time of 60 seconds.

(Carbonaceous Material)

A known carbonaceous material used in fuel cell separators can be used for the carbonaceous material contained in the thermoplastic resin sheet A and the thermoplastic resin sheet B. Specific examples include carbon black, carbon fiber, amorphous carbon, expanded graphite, synthetic graphite, natural graphite, kish graphite, vapor grown carbon fiber, carbon nanotubes and fullerene. Among these, one or more types selected from the group consisting of natural graphite, synthetic graphite and expanded graphite preferably accounts for 50% by weight to 100% by weight, more preferably 60% by weight to 100% by weight and even more preferably at 90% by weight to 100% by weight of the carbonaceous material used in sheet A. Synthetic graphite is preferably used for the carbonaceous material of sheet A in order to obtain a fuel cell separator having non-anisotropic electrical conductivity in particular.

The particle diameter of the natural graphite, synthetic graphite and expanded graphite in terms of the volume-based cumulative particle diameter is preferably such that $D_{10}$ is 3 μm to 15 μm, $D_{50}$ is 5 μm to 60 μm and $D_{90}$ is 60 μm to 100 μm, more preferably such that $D_{10}$ is 5 μm to 12 μm, $D_{50}$ is 5 μm to 50 μm and $D_{90}$ is 60 μm to 90 μm, and even more preferably such that $D_{10}$ is 7 μm to 10 μm, $D_{50}$ is 10 μm to 50 μm and $D_{90}$ is 60 μm to 80 μm. If particle diameter is 3 μm or less, electrical conductivity and mechanical characteristics decrease when filling a large amount of the carbonaceous material, thereby making this undesirable. In addition, if particle diameter is 100 μm or more, the appearance of the molding becomes poor and cracking occurs easily, thereby making this undesirable. The particle diameter of the carbonaceous material can be determined by adding a prescribed amount of sample and surfactant to a prescribed amount of distilled water and dispersing therein, followed by measuring particle size distribution by laser diffraction/scattering.

The powder resistance of the carbonaceous material is such that it is desirable that the powder electrical resistivity in a direction perpendicular to the direction in which pressure is applied when the powder density is set to 1.5 g/cm³ be as low as possible, is preferably 0.1 Ω·cm or less, and a value of 0.03 Ω·cm or less is preferable since it allows the obtaining of high electrical conductivity. Powder resistance can be measured according to the method described in Japanese Patent No. 3937962.

The true density of the carbonaceous material is preferably 1.6 g/cm³ to 2.25 g/cm³, more preferably 1.7 g/cm³ to 2.25 g/cm³, and even more preferably 1.9 g/cm³ to 2.25 g/cm³. A higher value for true density of the carbonaceous material results in greater progression of graphitization and favorable electrical conductivity. True density can be measured with the liquid displacement method or gas displacement method. For example, true density can be measured using the Pycnomatic System manufactured by Mountech Co., Ltd. or the VM-100 or MAT-7000 manufactured by Seishin Enterprise Co., Ltd.

The bulk density (tapped density) of the carbonaceous material is preferably 0.3 g/cm³ to 1.5 g/cm³, more preferably 0.5 g/cm³ to 1.5 g/cm³ and even more preferably 0.6 g/cm³ to 1.5 g/cm³. A higher value for bulk density enables a larger amount of the carbonaceous material to be filled, which is preferable since this facilitates the realization of high electrical conductivity.

Tapped density can be measured according to the Kawakita method using a commercially available bulk density measuring device. Examples of commercially available bulk density measuring devices include the Powder Tester PT-S (Hosokawa Micron, Ltd.) and Tap Denser KYT-4000 (Seishin Enterprise Co., Ltd.). Although the number of taps can be determined arbitrarily, tapping is preferably continued until density stops decreasing. Tapped density may also be measured using a method in compliance with Section 616 of the United States Pharmacopeia or Section 2.9.15 of the European Pharmacopeia.

(Boron-Containing Carbonaceous Material)

If the carbonaceous material further preferably contains 0.01% by weight to 4% by weight, more preferably contains 0.05% by weight to 3% by weight, and even more preferably contains 0.1% by weight to 2% by weight of boron, the volume resistivity of the flow path portion of the resulting fuel cell separator decreases, thereby making this preferable. A carbonaceous material containing boron can be manufactured according to the methods described in Japanese Unexamined Patent Publication No. 2002-60639 and Japanese Unexamined Patent Publication No. 2005-281690. In addition, methods for measuring content by percentage are also described in the aforementioned patent documents.

(Fibrous Carbon)

50% by weight to 100% by weight of the carbonaceous material contained in the thermoplastic resin sheet B is fibrous carbon.

Examples of fibrous carbon include carbon fibers, vapor grown carbon fibers, carbon nanofibers and carbon nanotubes.

The mean fiber diameter (D) of the fibrous carbon is preferably 0.01 μm to 20 μm, more preferably 0.1 μm to 15 μm and even more preferably 1 μm to 10 μm, while the mean fiber length (L) is preferably 1 μm to 20 mm, more preferably 5 μm to 10 mm and even more preferably 1 mm to 10 mm, provided that the ratio L/D of the fibrous carbon is preferably 5 to 1000, more preferably 100 to 1000 and even more preferably 500 to 1000. If the ratio L/D is 5 or more, adequate fiber reinforcing effects can be obtained, while if the ratio L/D is 1000 or less, the fluidity of the resin composition containing the fibrous carbon serving as a raw material when manufacturing the thermoplastic resin sheets is favorable.

The aforementioned mean fiber diameter and mean fiber length of the fibrous carbon can be determined by measuring the fiber diameter and fiber length of 100 to 200 random fibers using a scanning electron microscope (SEM) and the like and calculating the arithmetic mean. In addition, fiber diameter and fiber length can also be measured using the FPIA-3000 manufactured by Hosokawa Micron, Ltd. if the values are within the range of 0.7 μm to 160 μm.

(Thermoplastic Resins)

Known thermoplastic resins used in fuel cell separators can be used for the thermoplastic resins contained in the thermoplastic resin sheet A and the thermoplastic resin sheet B. The following lists examples thereof.

Acrylic resin: acrylonitrile-butadiene-styrene copolymer, polymethyl methacrylate resin, etc.

Polyvinyl chloride

Polyimides

Liquid crystal polymers

Polyether ether ketones

Fluorine resins: Polytetrafluoroethylene, tetrafluoroethylene-perfluoroalkylvinyl ether copolymer resins, ethylene-tetrafluoroethylene copolymers, perfluoroethylene-propene copolymers, polyvinylidene fluoride, ethylene-chlorotrifluoroethylene copolymers, etc.

Polyolefins: polyethylene, polypropylene, polybutylene, polymethylpentene, polystyrene, polybutene-1, etc.

Polyacetals

Polyamides

Polyesters: polyethylene terephthalate, polybutylene terephthalate, etc.

Polycarbonates

Polycycloolefins

Polyphenylene sulfide

Polyether sulfone

Polyphenylene oxide

Polyphenylene sulfone

If the aforementioned thermoplastic resin is preferably at least one type selected from the group consisting of polyolefins, fluorine resins, polybutylene terephthalate, polyphenylene sulfide, liquid crystal polymers, polyether ether ketones, polycycloolefins and polyether sulfone having a melting point of 100° C. or higher, and polycarbonates, polystyrene and polyphenylene oxide having a glass transition temperature of 100° C. or higher, more preferably a crystalline polyolefin, and most preferably crystalline polypropylene, a fuel cell separator is obtained that is resistant to creep during fuel cell operation and has favorable hydrolysis resistance.

The melting point and glass transition temperature of the thermoplastic resins can be measured by preparing a test piece in the standard state according to JIS K7121, and using a differential scanning calorimeter (DSC) to measure the melting point as the melting peak temperature and the glass transition temperature as the midpoint glass transition temperature.

(Thermoplastic Resin of Sheet B)

Although the thermoplastic resin of the thermoplastic resin sheet B may be the same as or different from the thermoplastic resin of the thermoplastic resin sheet A, a resin of the same type as the thermoplastic resin of the thermoplastic resin sheet A or a resin that is compatible with the thermoplastic resin of the thermoplastic resin sheet A is preferably contained at 20% by weight or more in the thermoplastic resin of the thermoplastic resin sheet B in order to prevent separation of the thermoplastic resin sheet A and the thermoplastic resin sheet B after molding the fuel cell separator. For example, if at least one type selected from the group consisting of polypropylene, polybutene-1, ethylene-propylene rubber, hydrogenated styrene-butadiene rubber and styrene-ethylene-butylene-styrene block copolymer is used for the thermoplastic resin of the thermoplastic resin sheet A and the thermoplastic resin of the thermoplastic resin sheet B, the thermoplastic resin of the thermoplastic resin sheet A and the thermoplastic resin of the thermoplastic resin sheet B are mutually compatible, thereby making this preferable.

Compatibility here refers to a combination of different types of partially meltable polymers that are able to be dispersed at a polymer mean particle diameter of 5 μm or less when dispersed after mixing and kneading, or a combination of different types of polymers that are able to melt into each other without undergoing phase separation.

If the thermoplastic resin of the thermoplastic resin sheet B contains 10% by weight or more of a thermoplastic resin subjected to modification treatment capable of chemically bonding to the surface of a fibrous filler or having favorable wettability therewith, the thermoplastic resin demonstrates high interfacial strength with the fibrous carbon or fibrous filler to be subsequently described, thereby making this preferable. The amount of modified thermoplastic resin in the thermoplastic resin sheet B is preferably 10% by weight to 50% by weight and more preferably 10% by weight to 30% by weight of the thermoplastic resin. Functional groups introduced as a result of modification treatment preferably consist of one or more types of functional groups selected from the group consisting of acid anhydride groups introduced by reacting with an acid anhydride such as maleic anhydride or phthalic anhydride, groups introduced by glycidyl acrylate or glycidyl methacrylate, amino groups, amido groups, vinyl groups, hydroxyl groups, carboxyl groups and thiol groups, and the thermoplastic resin is more preferably that in which acid anhydride groups or carboxyl groups have been introduced, namely that which has undergone acid modification. Examples of modification treatment methods include a method in which a modification agent is blended with a polymer followed by carrying out graft modification using an extruding machine, and a method in which modification treatment is carried out in solution. Commercially available modified resins can also be used, specific examples of which include Modic® (trade name) manufactured by Mitsubishi Chemical Corp., Admer® (trade name) manufactured by Mitsui Chemicals Inc., Yumex (trade name) manufactured by Sanyo Chemical Industries, Ltd., Melsen M (trade name) manufactured by Tosoh Corp., and Bondfast® (trade name) manufactured by Sumitomo Chemical Co., Ltd.

(Elastomer)

If the thermoplastic resin sheet A and the thermoplastic resin sheet B contain an elastomer having rubber-like elasticity in the vicinity of normal temperatures in addition to thermoplastic resin, the fuel cell separator becomes resistant to cracking, thereby making this preferable. If the content of the elastomer is preferably 0.05 parts by weight to 40 parts by weight, more preferably 1 part by weight to 40 parts by weight, and even more preferably 2 parts by weight to 10 parts by weight based on 100 parts by weight of the thermoplastic resin, the fuel cell separator is resistant to cracking, the flow paths thereof are resistant to deformation, and gas impermeability is favorable.

If the elastomer is dispersed in the aforementioned thermoplastic resin preferably at a mean particle diameter equal to or less than the mean particle diameter of the carbonaceous material and at 5 µm or less, more preferably 4 µm or less and even more preferably 3 µm or less, the resulting fuel cell separator has favorable electrical conductivity and is resistant to cracking.

The mean particle diameter of the elastomer can be determined as the number average particle diameter of about 100 particles by preparing ultra-thin sections from the cross-section of a sample frozen with liquid nitrogen using an ultramicrotome, and observing the particle diameter of the dispersed phase by transmission electron microscopy (TEM) following osmium staining.

Examples of elastomers include one or more types selected from the group consisting of acrylonitrile-butadiene rubber, hydrogenated nitrile rubber, styrene-butadiene rubber, ethylene-propylene copolymers, ethylene-octene copolymers, ethylene-butene copolymers, propylene-butene copolymers, ethylene-propylene-diene tertiary polymers, ethylene-butadiene rubber, fluorine rubber, isoprene rubber, silicone rubber, acrylic rubber, butadiene rubber, high styrene rubber, chloroprene rubber, urethane rubber, polyether-based rubber, tetrafluoroethylene-propylene rubber, epichlorhydrin rubber, norbornene rubber, butyl rubber, styrene-based thermoplastic elastomers, olefin-based thermoplastic elastomers, urethane-based thermoplastic elastomers, polyester-based thermoplastic elastomers, polyamide-based thermoplastic elastomers, 1,2-polybutadiene-based thermoplastic elastomers, fluorine-based thermoplastic elastomers and soft acrylic resins.

If the aforementioned elastomers consist of one or more types preferably selected froth the group consisting of hydrocarbon-based elastomers in the form of styrene-butadiene rubber, ethylene-propylene copolymers, ethylene-octene copolymers, ethylene-butadiene rubber, isoprene rubber, butadiene rubber, styrene-based thermoplastic elastomers, isoprene-based thermoplastic elastomers and 1,2-polybutadiene-based thermoplastic elastomers, the resistance to hydrolysis of the elastomer is favorable, thereby making this preferable, and styrene-based thermoplastic elastomers are particularly preferable.

Specific examples of styrene-based thermoplastic elastomers include hydrogenated styrene-butadiene rubber, styrene-ethylene-butylene-styrene block copolymers, styrene-ethylene-propylene-styrene block copolymers, styrene-ethylene-butylene-olefin crystal block copolymers, styrene-isoprene-styrene block copolymers and styrene-butadiene-styrene block copolymers, and among these, hydrogenated styrene-butadiene rubber, styrene-ethylene-butylene-styrene block copolymers and styrene-ethylene-propylene-styrene block copolymers are preferable.

(Other Components of Sheet A)

In addition to the aforementioned materials, the thermoplastic resin sheet A can also suitably contain additives such as an antioxidant, thermal stabilizer, halogen scavenger, antimicrobial, inorganic filler, lubricant, plasticizer, flame retardant, surfactant, hydrophilicity imparting agent, water repellent or slidability imparting agent. The total added amount of these additives is preferably 0% by weight to 20% by weight of the thermoplastic resin sheet A.

(Fibrous Filler)

The thermoplastic resin sheet B may also contains a fibrous filler other than the fibrous carbon. A "fibrous filler other than the fibrous carbon" and "fibrous carbon" are collectively referred to as "fibrous filler". If the thermoplastic resin sheet B contains 3% by weight to 70% by weight, preferably 5% by weight to 60% by weight, and more preferably 10% by weight to 50% by weight of the fibrous filler, mechanical characteristics of the fuel cell separator can be improved.

Examples of fibrous fillers other than fibrous carbon include one or more types selected from the group consisting of glass fiber, metal fiber, organic fiber, ceramic fiber and metal oxide-based whiskers, and fibrous carbon is preferable from the viewpoints of electrical conductivity and corrosion resistance of the fuel cell separator.

The mean fiber diameter (D), mean fiber length (L) and ratio of L/D of the fibrous filler are preferably within the same ranges as those of the aforementioned fibrous filler, and the reasons for this are also the same.

The aforementioned mean fiber diameter and mean fiber length of the aforementioned fibrous filler can be determined by measuring the fiber diameter and fiber length of 100 to 200 random fibers using a scanning electron microscope (SEM) and the like and calculating the mean thereof. In addition, fiber diameter and fiber length can also be measured using the FPIA-3000 manufactured by Hosokawa Micron, Ltd. if the values are within the range of 0.7 µm to 160 µm.

The aforementioned fibrous filler may be coated with carbon or metal and the like for the purpose of imparting electrical conductivity to the surface thereof. Coating can be carried out by, for example, vapor deposition (such as chemical vapor deposition, metal organic chemical vapor deposition, vacuum deposition, sputtering or ion plating), electroless plating, electroplating, painting or chemical conversion treatment.

In addition, one or more types of functional groups selected from the group consisting of epoxy groups, carboxyl groups, carbonyl groups, hydroxyl groups, amino groups, acid anhydride groups, glycidyl groups, isocyanato groups, thiol groups, vinyl groups, acryloxy groups and methacryloxy groups are preferably imparted by surface treatment in order to improve adhesion with resin. For example, functional groups can be imparted by silane coupling treatment, strong acid treatment, plasma treatment, corona treatment or other chemical conversion treatment.

(Other Components of Sheet B)

In addition to each of the aforementioned components, the thermoplastic resin sheet B can contain one or more types of additives similar to those listed as examples of additives able to be contained in thermoplastic resin sheets as well as fillers other than fibrous fillers, and the total added amount thereof is 0% by weight to 80% by weight of the thermoplastic resin sheet B.

(Method for Manufacturing Thermoplastic Resin Sheet A)

The thermoplastic resin sheet A is manufactured by first mixing each of the aforementioned materials. There are no particular limitations on the method used for mixing, and for example, a kneading machine such as a roll mill, extruder, kneader or Banbury mixer can be used, and the materials are mixed as uniformly as possible.

Next, the mixed materials are molded into a sheet. Furthermore, after mixing the materials, the mixed materials can also be crushed or granulated to facilitate supply to a molding machine or mold.

The sheet can be molded by, for example, a method that uses an extruder, a method that combines an extruder and rolling mill, or a method in which the powdered mixed material is supplied to rollers. The temperature of the rolling mill is preferably equal to or lower than the solidification temperature of the binder component in the sheet.

(Volume Resistivity of Thermoplastic Resin Sheet A)

The volume resistivity value of the thermoplastic resin sheet A at 23° C. is preferably 50 mΩ·cm or less and more preferably 10 mΩ·cm or less. As a result, electrical conductivity of the flow path portion of a fuel cell separator obtained using the thermoplastic resin sheet A improves. In addition, the volume resistivity value of the thermoplastic resin sheet A at 23° C. is preferably 0.1 Ω·cm or more and more preferably 1 mΩ·cm or more.

The volume resistivity value is measured according to the four probe method in compliance with JIS K7194.

(Method for Manufacturing Thermoplastic Resin Sheet B)

Although the thermoplastic resin sheet B can be manufactured by mixing each of the aforementioned raw materials and molding into a sheet in the same manner as the thermoplastic resin sheet A, commercially available carbon fiber-containing organic resins can also be used after molding into a sheet. Specific examples of such resins include Pyrofil® pellets manufactured by Mitsubishi Rayon Co., Ltd., Torayca® pellets manufactured by Toray Industries, Inc., and Plastron manufactured by Daicel Polymer Ltd.

(Mechanical Characteristics of Thermoplastic Resin Sheet B)

The bending strain of the thermoplastic resin sheet B at 70° C. is preferably 0.5% or more, more preferably 1.0% or more and even more preferably 1.5% or more, while the bending strength at 70° C. is preferably 25 MPa or more, more preferably 30 MPa or more and even more preferably 35 MPa or more. As a result, mechanical characteristics of a fuel cell separator obtained using the thermoplastic resin sheet B are improved. In addition, the bending strain of the thermoplastic resin sheet B at 70° C. is preferably 10% or less and more preferably 5% or less, while the bending strength at 70° C. is preferably 500 MPa or less and more preferably 200 MPa or less.

Bending strain and bending strength are measured using a Tensilon testing machine. The thermoplastic resin sheet B cut out to a size of 50 mm×10 mm×a prescribed thickness is measured according to a 3-point bending test under conditions of a span of 24 mm, bending speed of 1 rum/min and temperature of 70° C.

(Melting Points of Binder Components in Thermoplastic Sheets)

The difference ($Tm_A-Tm_B$) between the melting point $Tm_A$ of the binder component in the thermoplastic resin sheet A and the melting point $Tm_B$ of the binder component in the thermoplastic resin sheet B is preferably such that $0 \leq (Tm_A - Tm_B) \leq 80°$ C., more preferably such that $2 \leq (Tm_A - Tm_B) \leq 70°$ C., and even more preferably such that $2 \leq (Tm_A - Tm_B) \leq 60°$ C. As a result, a fuel cell separator can be obtained with a short molding cycle that has high electrical conductivity of the flow path portion. In addition, if the melting point $Tm_A$ is higher than the melting point $Tm_B$, fuel cell separators are heat-sealed when the thermoplastic resin sheet B is installed on the surface, and contact resistance of the electrical power generating portion can be reduced, thereby making this preferable.

The melting point of binder components in the thermoplastic resin sheets is obtained by placing a sample in the form of a suitably cut piece of the thermoplastic resin sheet in a sample container and measuring in the same manner as measurement of the melting points of the thermoplastic resins as previously described using a commercially available differential scanning calorimeter. However, in the case two or more melting peaks are observed, the melting peak temperature of the peak observed at the lower temperature is taken to be the melting point of the binder component.

(Sheet Lamination Method)

The fuel cell separator is obtained by compression molding the thermoplastic resin sheet A and the thermoplastic resin sheet B in a state in which the sheets are laminated at least one sheet at a time. Furthermore, although there are no particular limitations on the manner in which the sheets are laminated, and one sheet each may be laminated at a time in the manner of A/B, one sheet may be made to be interposed by the other sheet in the manner of A/B/A or B/A/B, or a larger number of sheets may be laminated, they are preferably laminated in the manner of B/A/B. In the case of laminating two or more of at least one of the thermoplastic resin sheet A and the thermoplastic resin sheet B, the thermoplastic resin sheet A and the thermoplastic resin sheet B are preferably alternately laminated.

The sheets that are laminated during compression molding are not limited only to the thermoplastic resin sheet A and the thermoplastic resin sheet B described in the present invention, but rather another sheet C having different characteristics can be also be arbitrary laminated and compression molded in the manner of, for example, C/B/A/B/C or C/A/B.

Moreover, a base material (such as a base fabric made of glass fiber, organic fiber, carbon fiber or ceramic fiber, or a non-woven fabric, resin sheet, metal mesh, resin mesh or metal sheet) can also be installed and molded on the outer peripheral portion for the purpose of improving strength and dimensional stability of the outer peripheral portion surrounding the flow path portion.

(Sheet Installation Method)

The fuel cell separator of the present invention is preferably composed such that the flow path portion consists mainly of a region A derived from the thermoplastic resin sheet A, the outer peripheral portion consists mainly of a region B derived from the thermoplastic resin sheet B, and the ends consist only of the region B. If the fuel cell separator is configured in this manner, the flow path portion contains a large amount of carbonaceous material resulting in favorable electrical conductivity, while the outer peripheral portion, and particularly the ends, which are susceptible to the application of external force, contain carbon fiber, thereby resulting in favorable mechanical characteristics.

Figure 5:
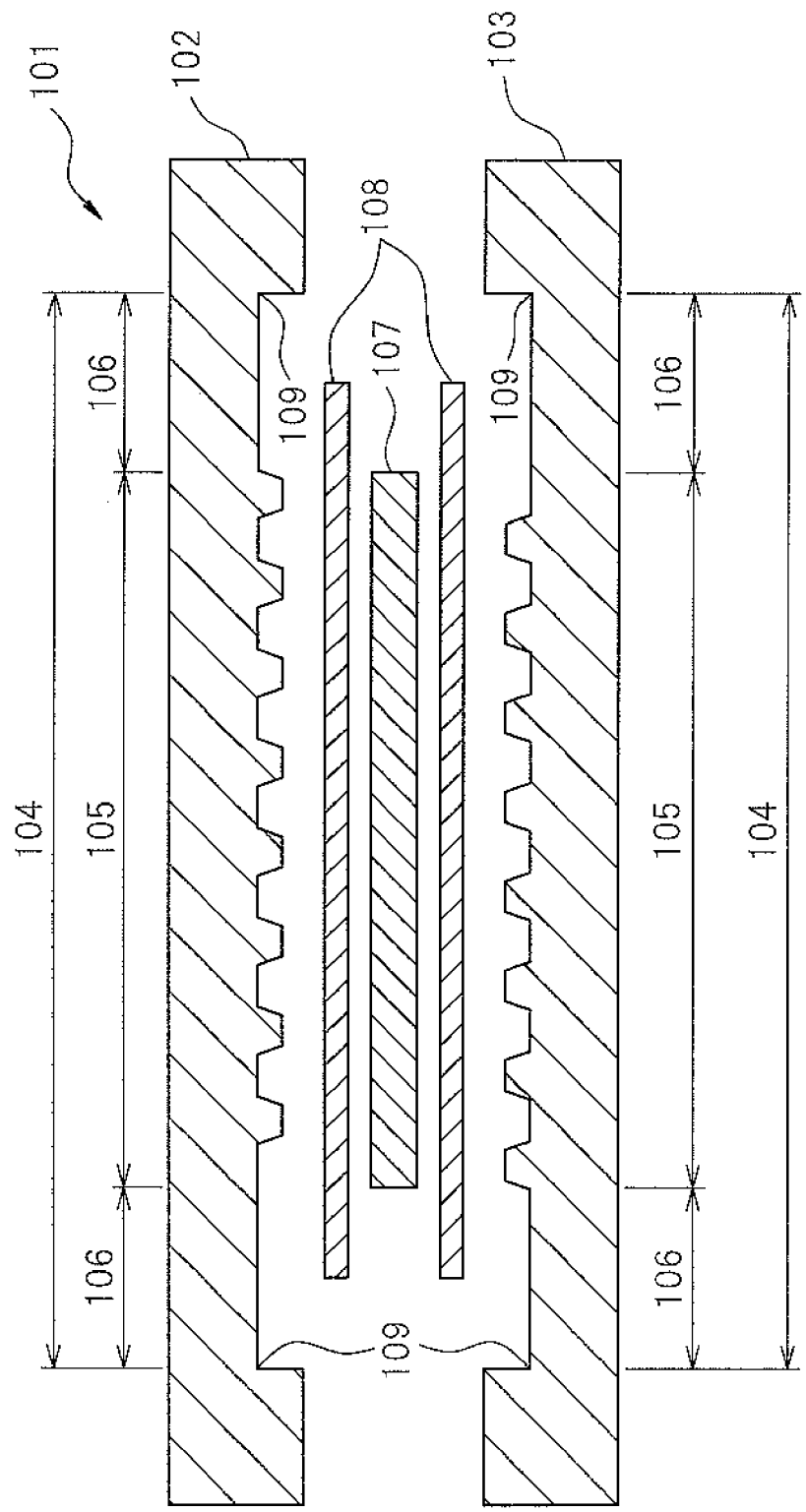
FIG. 5 is a schematic cross-sectional diagram showing one example of a mold for compression molding a fuel cell separator and one example of a procedure for installing a thermoplastic resin sheet A and a thermoplastic resin sheet B in the mold.

The following provides an explanation of the manner in which the thermoplastic resin sheet A and the thermoplastic resin sheet B are installed in a mold in order to realize this configuration with reference to FIG. 5.

FIG. 5 is a schematic cross-sectional diagram showing one example of a mold used for compression molding a fuel cell separator and a preferable procedure for installing the thermoplastic resin sheet A and the thermoplastic resin sheet B in the mold. A mold 101 is composed of an upper mold 102 and a lower mold 103, the mold 101 has a molding portion 104 having a shape corresponding to the shape of the fuel cell separator to be obtained, and the molding portion 104 has a flow path corresponding portion 105 corresponding to the flow path portion of the fuel cell separator to be obtained and outer periphery corresponding portion 106 corresponding to the outer peripheral portion. Furthermore, although a pattern having a trapezoidal cross-section is formed in the flow path corresponding portion 105 in FIG. 5, the pattern may also be of a different shape such as that of a rectangular cross-section, serrated form or semicircular cross-section corresponding to the desired shape of the flow paths. In addition, a pattern corresponding to a manifold and the like may be formed in the outer periphery corresponding portion 106.

The thermoplastic resin sheet A 107 is installed in the mold in a shape that is able to cover the flow path corresponding portion 105, and allows the proportion of the region A derived from the thermoplastic resin sheet A to preferably account for 70% or more, more preferably 80% or more, and even more preferably 90% or more, of the flow path portion of the resulting fuel cell separator. If the sheet A 107 has a shape that is able to cover the flow path corresponding portion 105, the proportion of the region A accounting for the flow path portion can be adjusted according to the thickness of the sheet A 107 when installing in the mold. Although it is difficult to uniformly define the thickness of the sheet A 107 when installing in the mold since there are cases in which the volume of the thermoplastic resin sheet may be vary before and after compression molding due to the presence of microvoids in the thermoplastic resin sheet, and may also vary according to the degree of the presence of those voids, normally, in the case of installing the sheet A 107 in the mold 101 in a shape that covers the flow path corresponding portion 105, in order to make the volume of the region A that accounts for the flow path portion to be 70% or more, the thickness $t_A$ of the sheet A 107 when installed in the mold satisfies the relational expression indicated below. In this expression, $V_F$ represents the volume of the flow path portion, and $S_F$ represents the projected area of the flow path portion. In the case the flow paths of the fuel cell separator are formed in a roughly rectangular region as shown in FIGS. 1(a) and 1(b), then $S_F$ can be approximated as the area of the flow paths formed in the flow path region having a rectangular shape that contacts the portion closest to the outer peripheral portion, while $V_F$ can be approximated as the volume of the portion surrounded by that same rectangular shape. In addition, in the case the flow paths are formed in a helical shape, $S_F$ can be approximated as the area of a circle that contacts the portion of the flow paths closest to the outer peripheral portion.

$$t_A \geq 0.7 V_F/S_F$$

Similarly, $t_A$ normally satisfies the following relational expression in order to make the volume of the region A that accounts for the flow path portion to be 80% or more, $$t_A \geq 0.8 V_F/S_F$$

and similarly, $t_A$ normally satisfies the following relational expression in order to make the volume of the region A that accounts for the flow path portion to be 90% or more.

$$t_A \geq 0.9 V_F/S_F$$

If the volume of the region A derived from sheet A accounting for the flow path portion of the resulting fuel cell separator is 70% or more, then two or more of the thermoplastic resin sheet A can be laminated. In this case, $t_A$ in each of the aforementioned relational expressions is the total thickness of each sheet A when installing in the mold.

If the thermoplastic resin sheet A satisfies these conditions, the proportion of the region A accounting for the flow path portion of the resulting fuel cell separator increases, the entire flow path portion is composed mainly of the region A, and electrical conductivity of the flow path portion improves as a result thereof.

Moreover, the thermoplastic resin sheet A 107 is installed in the mold 101 so that the shape of the primary surface thereof fits inside the mold 101 preferably by 95%, more preferably by 90%, and even more preferably by 85% of the distance from the flow path corresponding portion 105 to the outer ends 109 of the molding portion. In addition, the thickness of the thermoplastic resin sheet A 107 when installed in the mold 101 is preferably smaller than the maximum value of the wall thickness of the flow portion of the resulting fuel cell separator. Furthermore, the wall thickness of the separator refers to the shortest distance that passes from one of the primary surfaces of the separator to the other primary surface of the separator. If the thermoplastic resin sheet A has such a shape, the proportion of the region A derived from the thermoplastic resin sheet A decreases in the outer peripheral portion susceptible to the application of external force, and as a result thereof, the proportion of the region B derived from the thermoplastic resin sheet B increases, thereby allowing the obtaining of a fuel cell separator having superior mechanical characteristics.

The thermoplastic resin sheet B 108 is preferably installed in the mold in a shape such that the thickness thereof prior to compression molding is less than the thickness of the thermoplastic resin sheet A 107 prior to compression molding, and such that the primary surface thereof is contained inside the molding portion of the mold. Furthermore, in the case of laminating one sheet each of the sheet A 107 and the sheet B 108, or in the case of laminating two or more of both sheets, "thickness" as referred to here indicates the total thickness of each sheet A 107 and sheet B 108. If the thermoplastic resin sheet B 108 has such a shape, the proportion of the region B derived from the thermoplastic resin sheet B that accounts for the flow path portion of the resulting fuel cell separator decreases, and as a result thereof, electrical conductivity of the flow path portion improves since the proportion of the region A derived from the thermoplastic resin sheet A increases.

Figure 9:
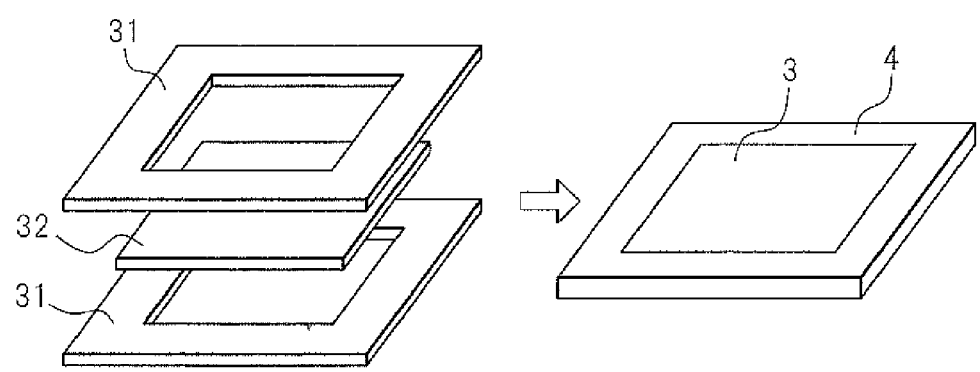
FIG. 9 is a schematic cross-sectional diagram showing another example of a procedure for installing a thermoplastic resin sheet A and a thermoplastic resin sheet B in a mold.

In addition, as shown in FIG. 9, the proportion of the region B that accounts for the flow path portion of the resulting fuel cell separator can also be reduced by installing a thermoplastic resin sheet B31 in the mold that has a shape in which an opening is formed in the portion corresponding to the flow path portion. The shape of a thermoplastic resin sheet A32 at this time is the same as that previously described. The edges of the thermoplastic resin sheet A32 and the edges of the opening formed in the thermoplastic resin sheet B31 are preferably such that they slightly mutually overlap. At this time, there are no particular limitations on the thickness of the thermoplastic resin sheet B31 provided it is equal to or less than the maximum value of the wall thickness of the separator. The flow path portion and the outer peripheral portion of a fuel cell separator obtained in this manner both substantially comprise a single layer structure.

Moreover, the thermoplastic resin sheet B is preferably installed in the mold such that the shape of the primary surface thereof is that which is able to cover the primary surface of the thermoplastic resin sheet A, and such that the volume following compression molding thereof is equal to or greater than the difference between the total volume V of the resulting fuel cell separator and the volume accounted for by the aforementioned region A in the entire fuel cell separator. Although the volume of a sheet changes slightly before and after compression molding as was previously described, normally in order to satisfy the aforementioned condition following compression molding, the volume $V_B$ of the sheet B when installing in the mold is preferably such that $V_B \geq V-V_A$ when the total volume of the separator is defined as V and the volume of the sheet A before compression molding is defined as $V_A$. If the thermoplastic resin sheet B is installed in the mold having such a shape, the volume of the region B derived from the thermoplastic resin sheet B accounting for the outer peripheral portion of the resulting fuel cell separator increases, thereby making this preferable. More preferably, if burrs are intentionally allowed to appear by inserting the thermoplastic resin sheet B so that the volume of the sheet B after compression molding is greater than the difference between the total volume of the fuel cell separator and the volume of the aforementioned thermoplastic resin sheet A after compression molding, the defect rate with respect to decreased edge thickness, lower edge density or shorter dimensions of the resulting fuel cell can be lowered. In this case, $V_B$ is normally such that $V_B > V_A$.

The thermoplastic resin sheet A and the thermoplastic resin sheet B are preferably installed in the mold so that the centers thereof are roughly aligned with the center of the molding portion of the mold.

(Molding Method)

Figure 6:
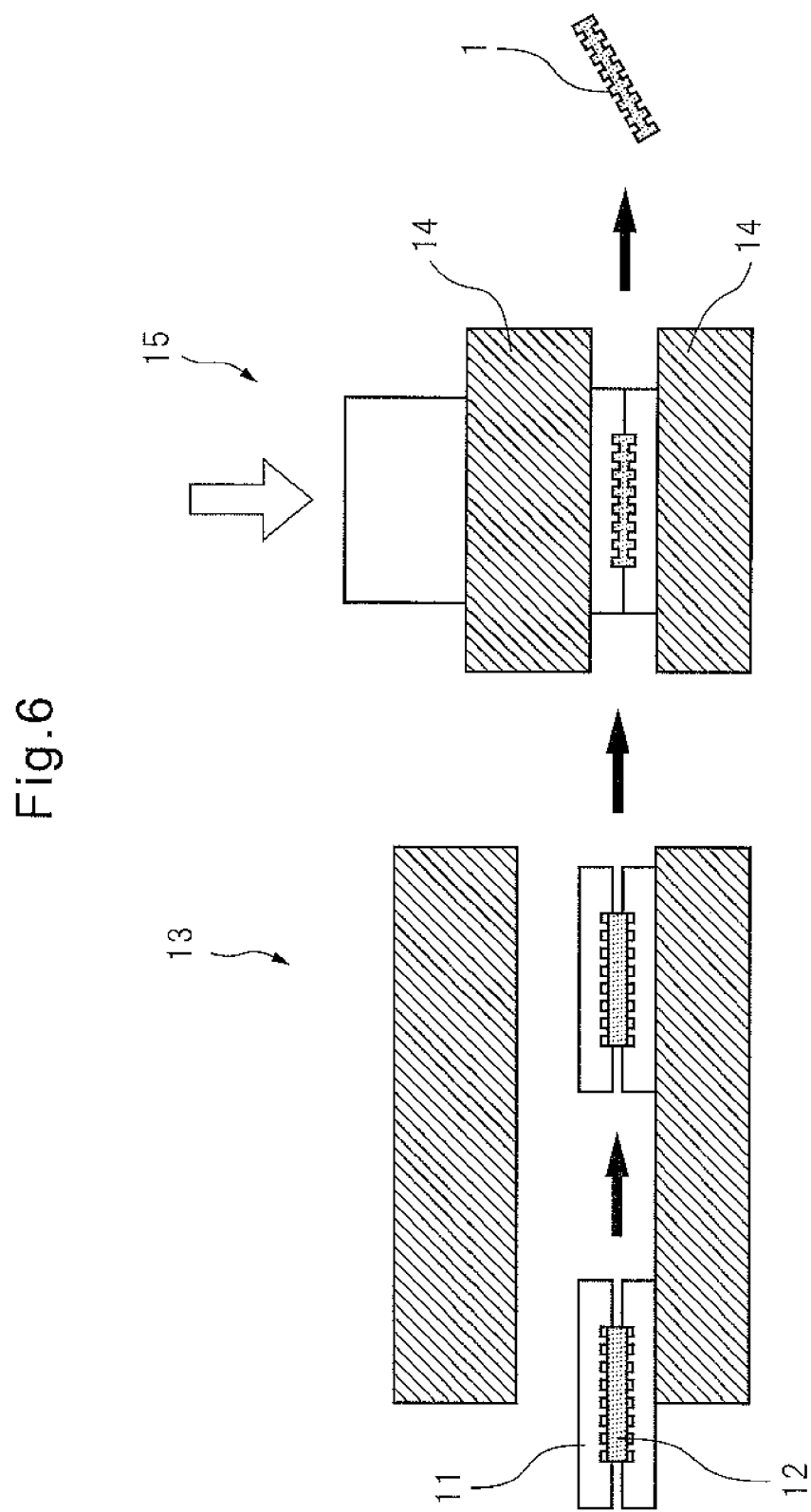
FIG. 6 is a schematic diagram showing one example of manufacturing a fuel cell separator.

Although there are no particular limitations on the method used for compression molding, a system like that shown in FIG. 6, for example, may be used in which a separator material sheet 12 composed of the thermoplastic resin sheet A and the thermoplastic resin sheet B is preliminarily placed in a separator mold 11, the separator material sheet 12 is preheated to a temperature equal to or higher than the melting points of the thermoplastic resin sheet A and the thermoplastic resin sheet B in a heating area 13, and the material is shaped by pressurizing and cooling the mold for a fixed amount of time with a cold press 15 having an output of 50 t to 1000 t equipped with cooling plates 14 controlled with cooling water and the like so as to be maintained at a temperature of 10° C. to 120° C., followed by opening the mold and removing the fuel cell separator 1. Furthermore, in FIG. 6, black arrows indicate the direction of movement of the mold and the like, while the white arrow indicates the direction in which pressure is applied. Although examples of heating means include electricity, induction heating, infrared rays and heating media, pressurization and cooling can also be carried out with a cold press after heating and shaping using a hot press molding machine. The molding cycle can be shortened by arranging the required number of presses in a row and dividing the number of pressing steps.

In addition, a fuel cell separator can also be obtained by heating the sheets to a temperature higher than the melting points thereof, shaping at a prescribed pressure, cooling while maintaining pressurization and then opening the mold at a prescribed temperature using a mold having medium flow paths that is able to perform heating and cooling by alternately switching between a high-temperature fluid and low-temperature fluid, or a mold having two types of flow paths through which flow a heating medium in the manner of silicon oil and cooling water.

In addition, a separator can also be obtained by placing thermoplastic resin sheets in a mold, heating only the surface of the mold with an inducting heating device, and then closing the mold followed by pressurization and cooling.

Molding may also be carried out by inserting the thermoplastic resin sheets after coating the mold with a mold release agent as necessary.

The shape of the fuel cell separator after molding may be further subjected to secondary processing such as by forming a manifold by cutting as necessary.

The surface roughness of the molded fuel cell separator may be controlled by blasting or using another type of grinding device for the purpose of creating a uniform surface, surface modification or removal of the skin layer and the like. Alternatively, the surface can be subjected to hydrophilic treatment for the purpose of suppressing fuel cell flooding phenomena. Examples of hydrophilic treatment include plasma treatment, corona treatment, ozone treatment, fluorine gas treatment, application of a hydrophilic coating, and coating with a hydrophilic filler.

(Sealing)

Figure 4:
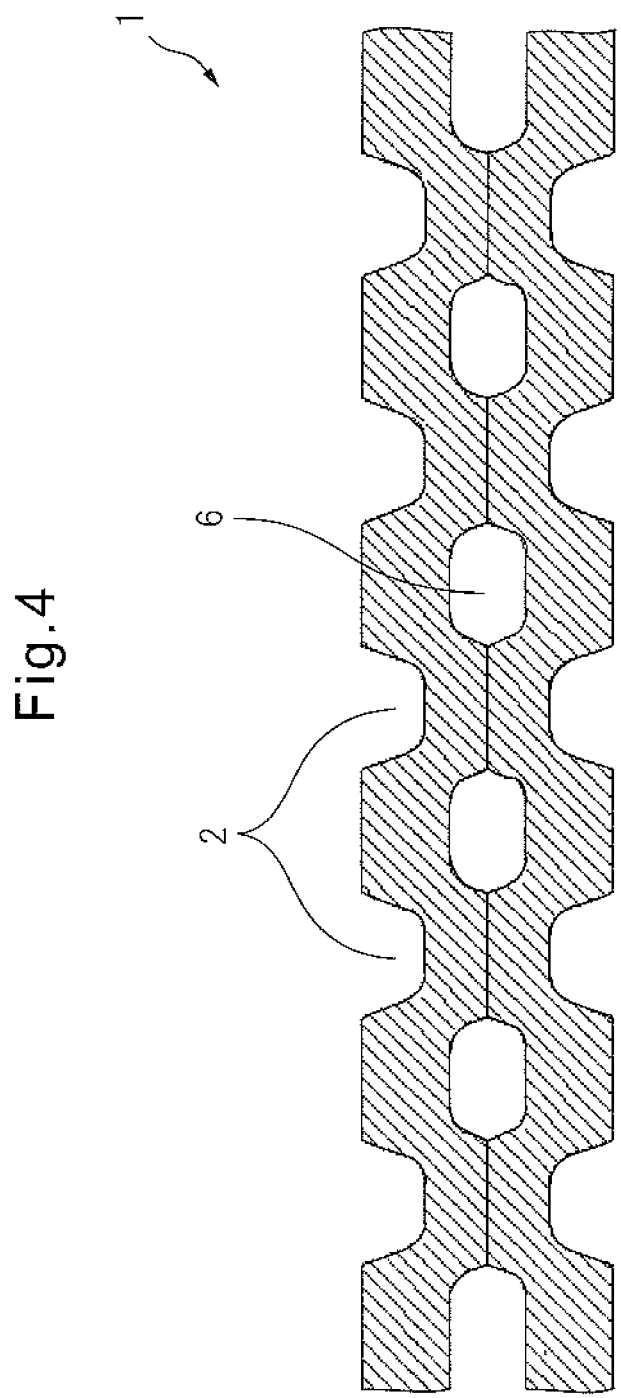
FIG. 4 is a schematic cross-sectional diagram of a flow path portion of a fuel cell separator having hollow flow paths.

Moreover, a fuel cell separator having hollow flow paths 6 roughly in the center in the direction of thickness of flow path portion cross-sections as shown in FIG. 4 can be obtained by superimposing two sheets and joining together as necessary. Sealing the flow path portions makes it possible to significantly reduce contact resistance of the electrical power generating portion. Although there are no particular limitations on the sealing method, a preferable method consists of applying a prescribed pressure using a hot press and heat sealing at a temperature at which only the surface layer melts. Other examples include a method in which the two sheets are joined using an electrically conductive adhesive, a method in which the two sheets are joined by dissolving the surfaces with a solvent, a method in which the two sheets are joined using a laser, and a method in which the two sheets are joined using high-frequency or ultrasonic waves.

(Various Characteristics of Fuel Cell Separator)

The fuel cell separator obtained according to the method of the present invention contains the region A derived from the thermoplastic resin sheet A and the region B derived from the thermoplastic resin sheet B. The composition of the region A is the same as the composition of the thermoplastic resin sheet A, the composition of the region B is the same as the composition of the thermoplastic resin sheet B, and the preferable ranges thereof, preferable types of materials and characteristics are also the same.

In one embodiment of the fuel cell separator obtained according to the method of the present invention, when a cross-section of the fuel cell separator is observed with a scanning electron microscope and the like, the region A is observed as a region in which 35% to 90% of the fields are occupied by images of carbonaceous material, while 5% to 60% of the fields are occupied by images of thermoplastic resin, while the region B is observed as a region in which 3% to 60% of the fields are occupied by images of carbonaceous material, while 35% to 95% of the fields are occupied by images of thermoplastic resin, while 50% to 100% of the fields containing images of carbonaceous material are occupied by images of fibrous carbon.

Figure 7:
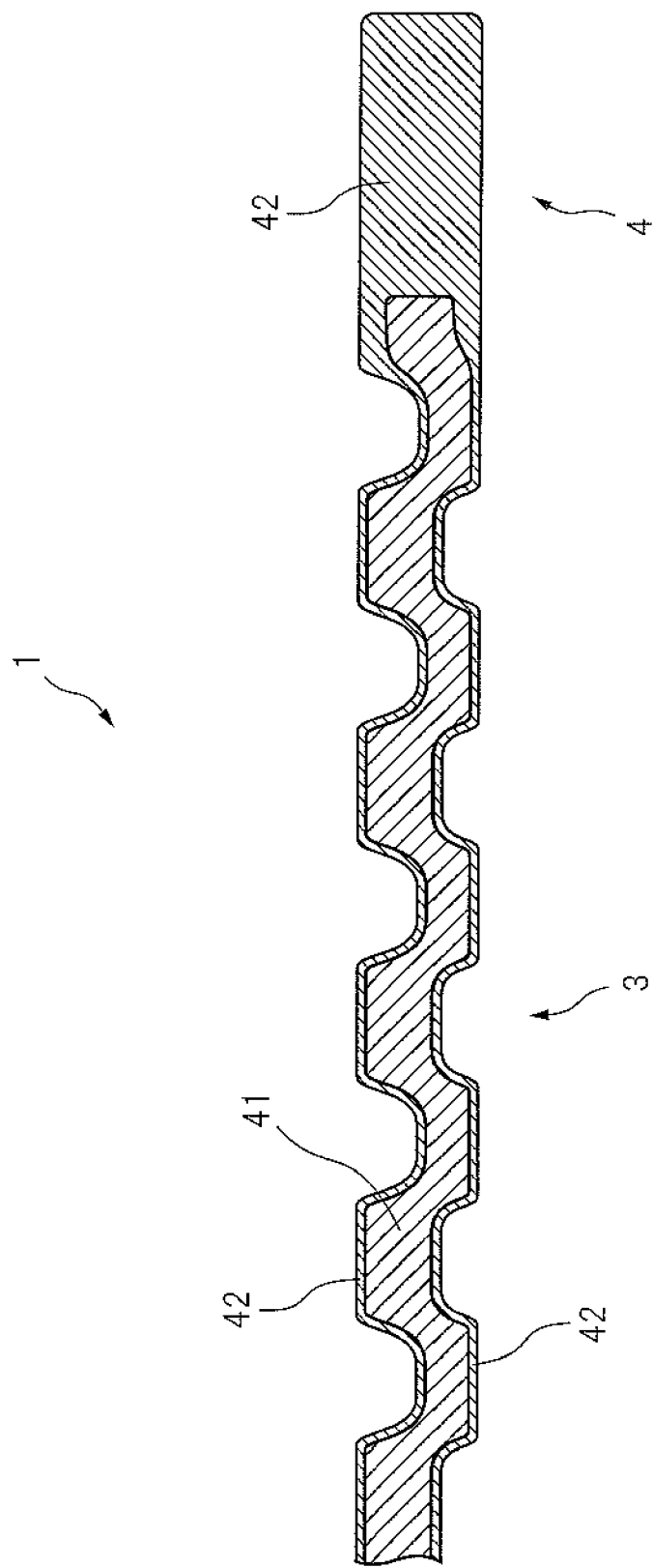
FIG. 7 is a schematic cross-sectional diagram of one embodiment of a fuel cell separator.

A schematic cross-sectional view of one embodiment of the fuel cell separator obtained according to the method of the present invention is shown in FIG. 7. In FIG. 7, reference symbol 41 indicates the region A, while reference symbol 42 indicates the region B.

Figure 8:
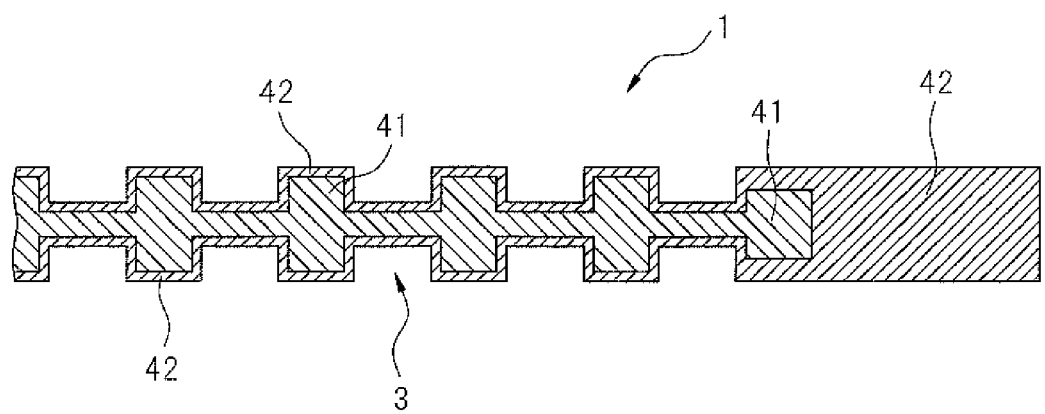
FIG. 8 is a schematic cross-sectional diagram of another embodiment of a fuel cell separator.

Furthermore, although FIG. 7 indicates an example of a fuel cell separator having corrugated flow paths, the fuel cell separator may also have non-corrugated flow paths as shown in FIG. 8.

In the fuel cell separator obtained according to the method of the present invention, since the flow path portion is mainly composed of the region A derived from the thermoplastic resin sheet A while the outer peripheral portion is mainly composed of the region B derived from the thermoplastic resin sheet B, the characteristics thereof reflect the characteristics of each sheet, and are as described below.

(Configuration of Flow Path Portion)

The majority of the flow path portion, preferably 70% to 100%, more preferably 80% to 95% and even more preferably 90% to 95% of the flow path portion, is composed of the region A derived from the thermoplastic resin sheet A. In addition, the flow path portion preferably has the region B derived from the thermoplastic resin sheet B on the surface thereof. In one embodiment of the present invention, when the flow path portion in a cross-section roughly perpendicular to the primary surface of the resulting fuel cell separator is observed using an SEM and the like, 60% or more of the thickness of the fuel cell separator is occupied by images of the region A, and images of fibrous carbon derived from the sheet B are preferably observed on the surface of the flow path portion.

(Volume Resistivity of Flow Path Portion 3)

Volume resistivity of the flow path portion at 23° C. is preferably 50 mΩ·cm or less, more preferably 30 mΩ·cm or less, and even more preferably 20 mΩ·cm or less. As a result, electrical conductivity of the flow path portion improves. The volume resistivity value is measured according to the four probe method in compliance with JIS K7194. Furthermore, in the case it is difficult to cut out a test piece from the flow path portion to the size described in JIS K7194, measurement is carried out in the same manner by suitably changing the size of the test piece and measurement site.

(Boron Content of Flow Path Portion 3)

If boron is preferably contained in the flow path portion at 0.001% by weight to 3% by weight, more preferably at 0.01% by weight to 2% by weight, and even more preferably at 0.05% by weight to 2% by weight, volume resistivity of the flow path portion of the resulting fuel cell separator becomes small, thereby making this preferable. Boron content can be measured using the method described in Japanese Unexamined Patent Publication No. 2002-60639 or Japanese Unexamined Patent Publication No. 2005-281690.

(Configuration of Outer Peripheral Portion)

The outer peripheral portion is mainly composed of the region B, and may also contain the region A in some of the portions that contact the flow path portion. In one embodiment of the present invention, when the ends of the resulting fuel cell separator, namely regions within 1 mm to the inside from those portions farthest from the flow channel portion, are observed with an SEM and the like, images of the region A are not observed in any surfaces roughly parallel to the primary surface of the fuel cell separator or in any surfaces roughly perpendicular to the primary surface of the separator.

Moreover, the outer peripheral portion containing a larger amount of fibrous carbon than the flow path portion is preferable for improving the strength of the fuel cell separator.

(Density)

The fuel cell separator obtained according to the manufacturing method of the present invention mainly consists of the region A in which the flow path portion contains a large amount of carbonaceous material, and the region B in which the outer peripheral portion contains a larger amount of binder component. Thus, the density $D_F$ of the flow path portion and the density $D_O$ of the outer peripheral portion normally satisfy the relational expression $D_F \geq D_O$. If the densities of the flow path portion and outer peripheral portion are made to satisfy this expression, electrical conductivity improves, thereby making this preferable. Density of the fuel cell separator is measured in accordance with JIS K7112:

(Mechanical Characteristics of Fuel Cell Separator)

The bending strain of the fuel cell separator of the present invention at 70° C. is preferably 0.5% or more, more preferably 1.0% or more an most preferably 1.5% or more, while the bending strength at 70° C. is preferably 25 MPa or more, more preferably 30 MPa or more and most preferably 35 MPa or more. In addition, bending strain at 70° C. is preferably 10% or less and more preferably 5% or less, while bending strength at 70° C. is preferably 500 MPa or less and more preferably 200 MPa or less.

Bending strain and bending strength are measured using a Tensilon D testing machine. A test piece cut from the separator to a prescribed width, length and thickness is measured by a 3-point bending test under conditions of a prescribed span, bending speed of 1 mm/min and temperature of 70° C.

[Fuel Cell Cells]

The fuel cell cells are preferably cells for a polymer electrolyte fuel cell. Cells for a polymer electrolyte fuel cell are normally obtained by laminating fuel cell separators and a membrane-electrode assembly (MEA). More specifically, the cells have a single cell structure composed of a laminated structure in which fuel cell separators are respectively arranged on both sides of a single MEA.

The MEA referred to here is normally a five-layer structure in which catalyst layers are joined to both sides of a solid polymer electrolyte membrane, and both sides of the catalyst layers are interposed between carbon paper and the like serving as a gas diffusion layer.

The fuel cell of the present invention is a fuel cell that contains the aforementioned fuel cell separator. The fuel cell of the present invention is composed of one or a plurality of fuel cell cells containing the aforementioned fuel cell separator. The fuel cell of the present invention is preferably a polymer electrolyte fuel cell.

EXAMPLES

Although the following provides a more detailed explanation of the present invention through examples thereof, the present invention is not limited to the following examples.

(Manufacturing of Thermoplastic Resin Sheet A1)

Boron-containing graphite powder (powder resistance: 0.007 Ω·cm, boron content: 0.9% by weight) described in Japanese Unexamined Patent Publication No. 2005-281690 was used as synthetic graphite.

746 parts by weight of graphite powder, 100 parts by weight of polypropylene (SunAllomer Ltd., trade name: SunAllomer PX201N, melting point: 163° C.) and 2 parts by weight of styrene-ethylene-butylene-styrene block copolymer (Shell Chemical Corp., trade name: Kraton G 1652) were kneaded for 15 minutes at 230° C. and 30 rpm with a pressurized kneader (Moriyama Co., Ltd., Mix-Labo) to obtain a graphite resin composition (PA1).

This graphite resin composition was molded into a sheet having a width of 95 mm and thickness of 3 mm at a molding temperature of 210° C. using a 65 mm diameter single screw extruder (Tomi Machinery Co., Ltd.). Moreover, the sheet heated to 210° C. was sent to a rolling mill to obtain a thermoplastic resin sheet A1 by rolling to a width of 100 mm and thickness of 1 mm or 0.5 mm. Measurement of the melting point of the binder component in the sheet A1 yielded a Value of 167° C.

(Manufacturing of Thermoplastic Resin Sheet A2)

A thermoplastic resin sheet A2 was obtained in the same manner as the thermoplastic resin sheet A1 with the exception of using the materials shown in Table 1. Measurement of the melting point of the binder component in the sheet A2 yielded a value of 133° C.

(Manufacturing of Thermoplastic Resin Sheet B1)

77 parts by weight of polypropylene (SunAllomer Ltd., trade name: SunAllomer PM900 A, melting point: 163° C.), 23 parts by weight of acid-modified polypropylene (Sanyo Chemical Industries, Ltd., trade name: Yumex 1010), 5 parts by weight of styrene-ethylene-butylene-styrene block copolymer (Sheel Chemical Corp., trade name: Kraton G 1652) and 45 parts by weight of carbon fiber (Toho Tenax Co., Ltd., trade name: Tenax Chopped Fiber C205 6 mm, mean fiber diameter: 7μm, mean fiber length: 6 mm, L/D: 850) were kneaded at those ratios at a temperature of 230° C. and rotating speed of 300 rpm with a same direction twin screw extruder (Kobe Steel Ltd., KTX30) to obtain a resin composition (PB1). This resin composition was molded into a sheet having a width of 95 mm and thickness of 1 mm or 0.5 mm at a molding temperature of 210° C. using a 65 mm diameter single screw extruder (Tomi Machinery Co., Ltd.) to obtain a thermoplastic resin sheet B1. Measurement of the melting point of the binder component in the sheet B1 yielded a value of 162° C.

(Manufacturing of Thermoplastic Resin Sheet B2)

A thermoplastic resin sheet B2 was obtained in the same manner as the thermoplastic resin sheet B1 with the exception of making the mixing ratios of the materials used to be as shown in Table 1. Measurement of the melting point of the binder component in the sheet B2 yielded a value of 135° C.

(Manufacturing of Thermoplastic Resin Sheet B3)

A thermoplastic resin sheet B3 was obtained in the same manner as the thermoplastic resin sheet B1 with the exception of making the materials used to be as shown in Table 1. Measurement of the melting point of the binder component in the sheet B3 yielded a value of 165° C.

The melting point of each sheet was measured using a differential scanning calorimeter (PerkinElmer Inc., trade name: DSC7).

(Measurement of Final Compressed Thickness)

Each sheet was adjusted to a size having a diameter of 50 mm and thickness of 1 mm and then inserted between two cemented carbide plates having a diameter of 50 mm and thickness of 5 mm, followed by compressing using a hot press under conditions of a temperature of 230° C., surface pressure of 20 MPa and pressurization hold time of 60 seconds, releasing the pressure and cooling to 23° C., and measuring the final thickness with a micrometer. The measurement results were as shown below.

Final thickness $d_m$ of sheet A1=0.24 mm
Final thickness $d_{A2}$ of sheet A2=0.19 mm
Final thickness $d_{B1}$ of sheet B1=0.031 mm
Final thickness $d_{B2}$ of sheet B2=0.028 mm
Final thickness $d_{B3}$ of sheet B3=0.21 mm

TABLE 1

| Thermoplastic Resin Sheet | | | A1 | A2 | B1 | B2 | B3 |
|---|---|---|---|---|---|---|---|
| Sheet composition (parts by weight) | Carbonaceous material | Synthetic graphite | 746 | 590 | | | |
| | | Ketjen black | | | | | 15 |
| | | Carbon fiber[1] | | | 45 | 70 | 38 |
| | Thermoplastic resin | Polypropylene (SunAllomer PX201N)[2] | 100 | | | | 77 |
| | | Polypropylene (SunAllomer PM940M)[3] | | 100 | | 79 | |
| | | Polypropylene (SunAllomer PM900A)[4] | | | 77 | | |
| | | Acid-modified polypropylene[5] | | | 23 | 21 | 23 |
| | Elastomer | Styrene-ethylene-butylene-styrene block copolymer[6] | 2 | 4 | 5 | 5 | |
| Binder component melting point (° C.) | | | 167 | 133 | 162 | 135 | 165 |
| Final compressed thickness (mm) | | | 0.24 | 0.19 | 0.031 | 0.028 | 0.21 |

1) Toho Tenax Co., Ltd., trade name: Tenax Chopped Fiber C205 6 mm
2) SunAllomer Ltd., melting point: 163° C.
3) SunAllomer Ltd., melting point: 137° C.
4) SunAllomer Ltd., melting point: 163° C.
5) Sanyo Chemical Industries, Ltd., trade name: Yumex 1010
6) Shell Chemical Corp., trade name: Kraton G 1652

(Test Piece Fabrication Method)

Flat sheets were molded using a 50 t compression molding machine in order to evaluate the basis characteristics of the fuel cell separators.

Example 1

Sheet A1 was cut to a size of 60×60×1 mm and sheet B1 was cut to a size of 80×80×0.5 mm and then placed in the center of a mold cavity having a molding size of 100×100×1 mm in the order of B1/A1/B1. Next, the sheets were pressed for 1 minute at a temperature of 230° C. and surface pressure of 20 MPa with a 50 t compression molding machine followed by pressing and cooling with a cold press at 30° C. for 2 minutes at a surface pressure of 20 MPa to obtain a test piece.

The volume resistivity in the center of the test piece corresponding to the flow path portion of the fuel cell separator was measured according to the four probe method in compliance with JIS K7194.

Figure 10:
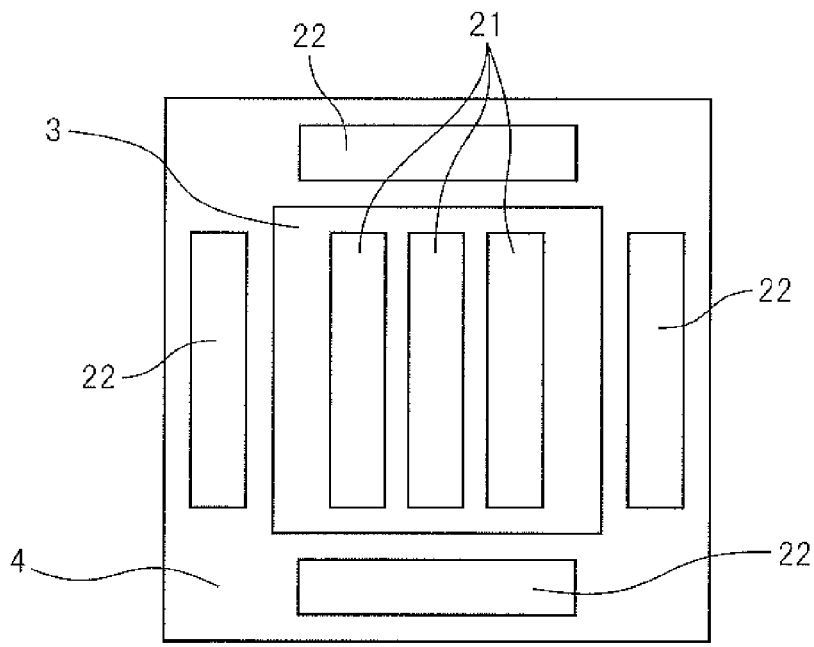
FIG. 10 is a schematic diagram showing sites where test pieces are cut out for a bending test and measuring density in an example of the present invention.

In order to measure bending strength and density of the portion corresponding to the flow path portion, flow path portion test pieces 21 having a size of 50×10×1 mm were cut from the resulting test piece from a range extending over an area of 60×60 mm in the center thereof as shown in FIG. 10. In addition, outer peripheral portion test pieces 22 cut to a size of 50×10×1 mm within the range of those areas extending 20 mm from the edges of the flat sheet were used in a bending test of the outer peripheral portion.

Bending strength and bending strain were measured using the Tensilon UTM-5T manufactured by Orientec Co., Ltd. The aforementioned flow path portion test pieces and outer peripheral portion test pieces were measured according to the 3-point bending test method under conditions of a span of 24 mm, bending speed of 1 mm/min, and temperatures of 23° C. and 70° C.

to a size of 95×95×0.15 mm, followed by placing in the center of a mold cavity having a molding size of 100×100×1 mm in the order of A2/A1/B1. Next, the sheets were pressed for 1 minute at a temperature of 230° C. and surface pressure of 20 MPa with a 50 t compression molding machine followed by pressing and cooling with a cold press at 30° C. for 2 minutes at a surface pressure of 20 MPa to obtain a test piece. The characteristics were evaluated in the same manner as Example 1, and the results are shown in Table 2.

Comparative Example 1

A test piece was fabricated in the same manner as Example 1 with the exception of using sheet B3 instead of sheet B1 in Example 1. Characteristics were evaluated in the same manner as Example 1, and the results are shown in Table 2.

Comparative Example 2

Sheet A1 was cut to a size of 95×95×1.2 mm and placed in the center of a mold cavity having a molding size of 100×100×1 mm and obtaining a test piece under the same molding conditions as Example 1.

Moreover, the test piece was cut out in the same manner as Example 1, characteristics were evaluated in the same manner as Example 1, and the results are shown in Table 2.

TABLE 2

| | | | Ex. 1 | Ex. 2 | Ex. 3 | Comp. Ex. 1 | Comp. Ex. 2 |
|---|---|---|---|---|---|---|---|
| | Layer composition | | B1/A1/B1 | B2/A1/B2 | A2/A1/B1 | B3/A1/B3 | A1 |
| | $d_A$ | mm | 0.24 | 0.24 | 0.23 | 0.24 | 0.24 |
| | $d_B$ | mm | 0.031 | 0.028 | 0.031 | 0.21 | — |
| | $d_A/d_B$ | | 7.7 | 8.6 | 7.4 | 1.1 | — |
| | Flow path portion | Volume resistivity | mΩ·cm | 6.40 | 5.75 | 5.88 | 67.1 | 5.94 |
| | Flow path portion | Density | g/cm³ | 1.62 | 1.71 | 1.75 | 1.65 | 1.86 |
| | Outer peripheral portion | | | 1.43 | 1.39 | 1.48 | 1.52 | 1.86 |
| 23° C. | Flow path portion | Bending strength | MPa | 63.1 | 65.3 | 61.2 | 56.8 | 47.0 |
| | | Bending strain | % | 1.10 | 1.23 | 1.08 | 0.78 | 0.59 |
| | Outer peripheral portion | Bending strength | MPa | 98.5 | 89.4 | 83.3 | 71.1 | 42.9 |
| | | Bending strain | % | 1.72 | 1.85 | 1.76 | 1.42 | 0.58 |
| 70° C. | Flow path portion | Bending strength | MPa | 62.0 | 60.5 | 57.5 | 52.8 | 36.2 |
| | | Bending strain | % | 1.53 | 1.78 | 1.66 | 1.44 | 1.03 |
| | Outer peripheral portion | Bending strength | MPa | 98.0 | 87.4 | 80.5 | 65.2 | 36.4 |
| | | Bending strain | % | 1.86 | 2.17 | 1.88 | 1.63 | 1.06 |
| Thickness precision | Flow path portion | Mean | mm | 1.03 | 0.99 | 1.05 | 1.22 | 1.11 |
| | | Deviation (max-min) | μm | 42 | 40 | 48 | 102 | 62 |
| | Outer peripheral portion | Mean | mm | 0.98 | 0.98 | 1.01 | 1.04 | 1.09 |
| | | Deviation (max-min) | μm | 52 | 48 | 54 | 89 | 56 |

In addition, density was measured according to the water replacement method in compliance with JIS K7112.

Figure 11:
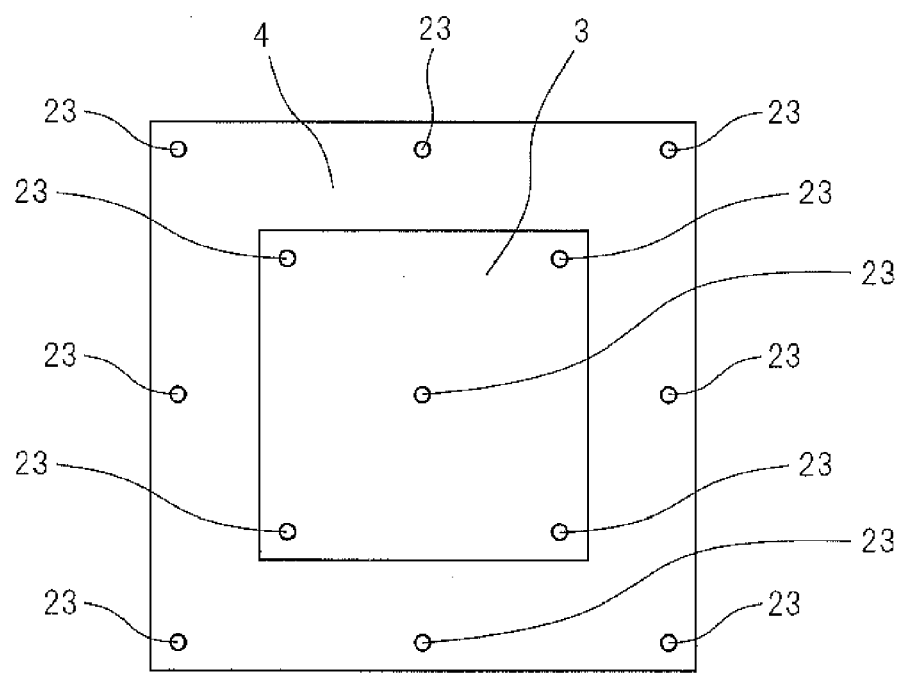
FIG. 11 is a drawing showing locations where the thickness of a test piece (flat sheet) is measured in an example of the present invention.

Thickness precision of the molded test pieces was evaluated by measuring thickness at the thickness measurement points 23 shown in FIG. 11 with a micrometer.

The results are shown in Table 2.

Example 2

A test piece was fabricated in the same manner as Example 1 with the exception of using sheet B2 instead of sheet B1 in Example 1. Characteristics were evaluated in the same manner as Example 1, and the results are shown in Table 2.

Example 3

Sheet A1 was cut to a size of 60×60×1 mm and sheet B1 was cut to a size of 95×95×0.6 mm, and sheet A2 was rolled Example 4

Sheet A1 was adjusted to a size of 160×120×0.6 mm using a rolling mill, and a piece having a size of 120×80×0.6 mm was cut from that sheet for use as sheet A1'.

In addition, sheet A2 was adjusted to a size of 160×120×0.1 mm using a rolling mill, and a piece having a size of 140×90×0.6 mm was cut from that sheet for use as sheet A2'.

Moreover, thermoplastic resin composition PB1 used in sheet B1 was molded to a width of 180 mm and thickness of 0.2 mm using an extrusion molding machine, and a piece having a size of 140×90×0.3 mm was cut from that sheet for use as sheet B1'.

Figure 2:
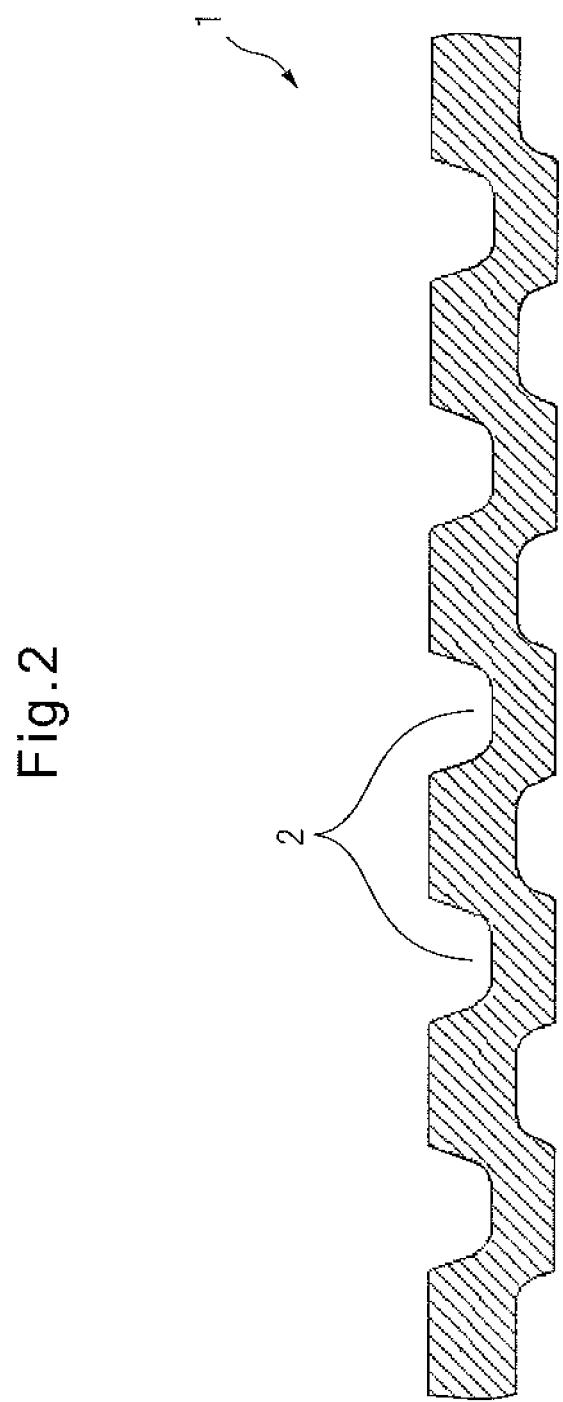
FIG. 2 is a schematic cross-sectional diagram showing one example of a fuel cell separator flow path portion.
Figure 3:
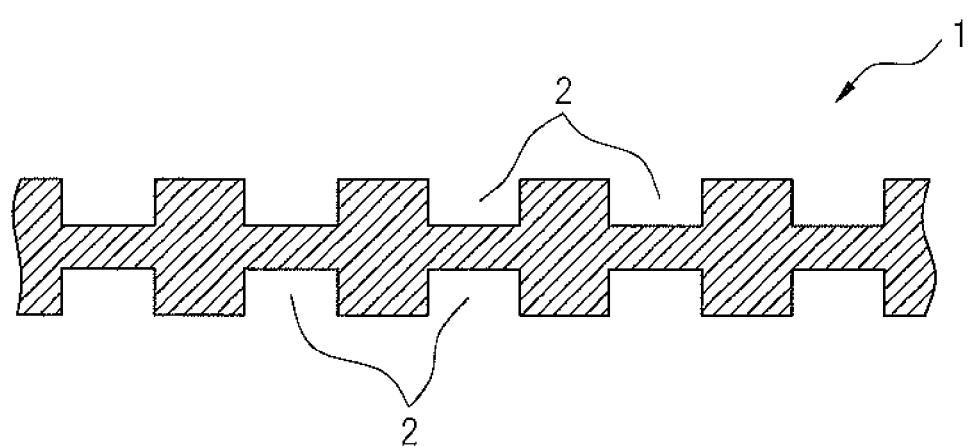
FIG. 3 is a schematic cross-sectional diagram showing another example of fuel cell separator flow path portion.

The fuel cell separator of the form shown in FIG. 1 has a size of 150×110×1 mm, a flow path portion of a size of 110×70 mm, a groove width of 1 mm, a groove depth of 0.5 mm on the front and 0.3 mm on the back, and a groove pitch of 2 mm. The aforementioned three sheets were placed in the center of the cavity of a mold for use with this separator in the order of A2'/A1'/B1'. Next, the sheets were pressed for 1 minute at a temperature of 240° C. and surface pressure of 30 MPa with a 50 t compression molding machine followed by pressing and cooling for 2 minutes at a surface pressure of 30 MPa with a cold press at 30° C. to obtain a fuel cell separator. FIG. 2 depicts a cross-section of the flow paths of the molded separator.

Moreover, two sheets of this fuel cell separator were superimposed with the A2' sides facing each other, held for a pressurizing time of 30 seconds at a temperature of 142° C. and surface pressure of 5 MPa with a hot press, and then held for a pressurizing time of 60 seconds at a temperature of 30° C. and surface pressure of 5 MPa with a cold press to seal the two fuel cell separators. FIG. 4 depicts a cross-section of the sealed flow paths.

As a result of uniformly dividing the sealed fuel cell separator into 25 portions and measuring dimensional precision with a micrometer, dimensional precision was found to be 2±0.015 mm. In addition, contact resistance at the sealing interface was 1.2 mΩ·cm² at a surface pressure of 0.5 MPa. On the other hand, as a result of measuring contact resistance without sealing, it was found to be 3.5 mΩ·cm² at a surface pressure of 0.5 MPa.

Contact resistance was measured by cutting out a piece of the flow path portion to a size of 20×20 mm and measuring voltage by contacting a probe in the vicinity of the sealing interface under conditions of a constant current of 1 A (Reference: Japanese Unexamined Patent Publication No. 2008-91097).

INDUSTRIAL APPLICABILITY

The method of the present invention can be preferably used to manufacture a fuel cell separator, and can also be preferably used to manufacture a fuel cell.

BRIEF DESCRIPTION OF THE REFERENCE SYMBOLS

Fuel cell separator
2 Grooves
3 Flow path portion
4 Outer peripheral portion
5 Internal manifold
6 Hollow flow paths
11 Mold
12 Separator material sheet
13 Heating area
14 Cooling plates
15 Cold press
21 Flow path portion test pieces
22 Outer peripheral portion test pieces
23 Thickness measurement points
31 Thermoplastic resin sheet B
32 Thermoplastic resin sheet A
41 Region A
42 Region B
101 Mold
102 Upper mold
103 Lower mold
104 Molding portion
105 Flow path corresponding portion
106 Outer periphery corresponding portion
107 Thermoplastic resin sheet A
108 Thermoplastic resin sheet B
109 Molding portion outer ends

The invention claimed is:

1. A method for manufacturing a fuel cell separator comprising a flow path portion in which gas flow paths are formed on one side or both sides thereof and an outer peripheral portion formed so as to surround the flow path portion,
wherein the method comprises a step of compression molding a thermoplastic resin sheet A comprising 100 parts by weight of a thermoplastic resin and 130 to 3200 parts by weight of a carbonaceous material and a thermoplastic resin sheet B comprising 100 parts by weight of a thermoplastic resin and 3 to 280 parts by weight of a carbonaceous material, 50% to 100% by weight of which is fibrous carbon, in a state in which the sheets are laminated at least one sheet at a time; and
when the thermoplastic resin sheet A and the thermoplastic resin sheet B are compressed from a sheet thickness of 1 mm under molding conditions consisting of a temperature 60° C. higher than the higher of the melting points of their respective binder components, surface pressure of 20 MPa and pressurization time of 60 seconds, the ratio of the final thickness $d_A$ of the thermoplastic resin sheet A to the final thickness $d_B$ of the thermoplastic resin sheet B satisfies the relational expression $d_A/d_B \geq 2$.

2. The method for manufacturing a fuel cell separator according to claim 1, wherein, when installing the thermoplastic resin sheet A in a mold for compression molding, the shape of the thermoplastic resin sheet A is that which is able to cover a portion corresponding to the flow path portion of the fuel cell separator, and when the thickness of the thermoplastic resin sheet A before compression molding is defined as $t_A$, the projected area of the flow path portion is defined as $S_F$ and the volume of the flow path portion is defined as $V_F$, the following relational expression is satisfied:

$$t_A \geq 0.7 V_F/S_F.$$

3. The method for manufacturing a fuel cell separator according to claim 1, wherein, when installing the thermoplastic resin sheet B in a mold for compression molding, the shape of the primary surface of the thermoplastic resin sheet B is that which is able to cover one primary surface of the thermoplastic resin sheet A, and the volume $V_B$ thereof satisfies the following relational expression:

$$V_B \geq V - V_A$$

wherein V represents the total volume of the resulting fuel cell separator and $V_A$ represents the volume of the thermoplastic resin sheet A when the thermoplastic resin sheet A is installed in the mold.

4. The method for manufacturing a fuel cell separator according to claim 1, wherein, when the melting point of a binder component of the thermoplastic resin sheet A is defined as $Tm_A$ and the melting point of a binder component of the thermoplastic resin sheet B is defined as $Tm_B$, then the following relational expression is satisfied:

$$0° C. \leq (Tm_A - Tm_B) \leq 80° C.$$

5. The method for manufacturing a fuel cell separator according to claim 1, wherein the volume resistivity value of the thermoplastic resin sheet A at 23° C. is 50 mΩ·cm or less.

6. The method for manufacturing a fuel cell separator according to claim 1, wherein the carbonaceous material contained in the thermoplastic resin sheet A is at least one selected from the group consisting of natural graphite, synthetic graphite and expanded graphite.

7. The method for manufacturing a fuel cell separator according to claim 1, wherein the fibrous carbon is at least one selected from the group consisting of carbon fibers, carbon nanofibers, carbon nanotubes and vapor grown carbon fibers.

8. The method for manufacturing a fuel cell separator according to claim 1, wherein the final thickness $d_A$ of the thermmoplastic resin sheet A is 0.1 to 0.07 mm and the final thickness $d_B$ of the thermoplastic resin sheet is 0.005 to 0.08 mm.

9. The method for manufacturing a fuel cell separator according to claim 1, wherein when the thermoplastic resin sheet B has a melting point, the thermoplastic resin sheet A has a meltting point higher than the melting point of the thermoplastic resin sheet B; and when the thermoplastic resin sheet B does not have a melting point, the thermoplastic resin sheet A has a melting point higher than a softening point of the thermoplastic resin sheet B.

10. The method for manufacturing a fuel cell separator according to claim 1, wherein when the thermoplastic resin sheet B has a melting point, the thermoplastic resin sheet A has a softening point higher than the melting point of the thermoplastic resin sheet B; and when the thermoplastic resin sheet B does not have a melting point, the thermoplastic resin sheet A has a softening point higher than the softening point of the thermoplastic resin sheet B.

11. A fuel cell separator manufactured by the method according to claim 1.

12. The fuel cell separator according to claim 11, wherein density $D_F$ of the flow path portion and density $D_O$ of the outer peripheral portion satisfy the relational expression $D_F \geq D_O$.

13. The fuel cell separator according to claim 11, wherein the flow path portion has hollow flow paths.

14. A fuel cell comprising the fuel cell separator according to claim 11.

15. The fuel cell according to claim 14 that is a polymer electrolyte fuel cell.

16. A fuel cell separator comprising a flow path portion in which gas flow paths are formed on one side or both sides thereof and an outer peripheral portion formed so as to surround the flow path portion,
wherein the separator has a region A comprising 100 parts by weight of a thermoplastic resin and 130 to 3200 parts by weight of a carbonaceous material and a region B comprising 100 parts by weight of a thermoplastic resin and 3 to 280 parts by weight of a carbonaceous material, 50% to 100% by weight of which is fibrous carbon; and
the region A accounts for 70% or more of the volume of the flow path portion and the ends of the separator consist of the region B,
wherein density $D_F$ of the flow path portion and density $D_O$ of the outer peripheral portion satisfy the relational expression $D_F \geq D_O$.

17. The fuel cell separator according to claim 16, wherein the flow path portion has hollow flow paths.

18. A fuel cell comprising the fuel cell separator according to claim 16.

19. The fuel cell according to claim 18 that is a polymer electrolyte fuel cell.

20. The fuel cell separator according to claim 16, wherein a difference ($Tm_A - Tm_B$) between a melting point $Tm_A$ of a binder component constituting the region A and a melting point $Tm_B$ of a binder component of a thermoplastic resin sheet B constituting the region B satisfies $2°C. \leq (Tm_A - Tm_B) \leq 70°C$.

21. The fuel cell separator according to claim 20, wherein density $D_F$ of the flow path portion and density $D_O$ of the outer peripheral portion satisfy the relational expression $D_F \geq D_O$.

22. The fuel cell separator according to claim 21, wherein the flow path portion has hollow flow paths.

23. A fuel cell comprising the fuel cell separator according to claim 22.

24. The fuel cell according to claim 23 that is a polymer electrolyte fuel cell.

* * * * *